United States Patent [19]

Stewart

[11] Patent Number: 5,460,357
[45] Date of Patent: Oct. 24, 1995

[54] MULTI-FUNCTION SLEEVES USED IN CONJUNCTION WITH REPLACEABLE ELASTOMERS FOR ADJUSTABLE SHOCK-ABSORBING SUSPENSION SYSTEMS OF BICYCLES AND MOTORCYCLES

[75] Inventor: Gerald M. Stewart, Camarillo, Calif.

[73] Assignee: Answer Products, Inc., Valencia, Calif.

[21] Appl. No.: 235,539

[22] Filed: Apr. 29, 1994

[51] Int. Cl.$^6$ ........................................................ F16F 1/40
[52] U.S. Cl. ........................ 267/294; 267/153; 267/141.1
[58] Field of Search ................................... 267/292, 294, 267/153, 141.1, 175; 188/284, 322.22, 268; 280/275, 276, 279, 283, 284

[56] References Cited

U.S. PATENT DOCUMENTS

| | | | |
|---|---|---|---|
| Re. 1,194 | 6/1861 | Vose | 267/294 |
| Re. 24,654 | 6/1959 | Sheets | 267/294 X |
| 28,619 | 6/1860 | Vose | 267/141.1 X |
| 2,683,034 | 7/1954 | Seddon . | |
| 2,683,044 | 7/1954 | Seddon . | |
| 2,708,112 | 5/1955 | Seddon . | |
| 3,606,295 | 9/1971 | Appleton | 267/292 |
| 4,561,641 | 12/1985 | DeYoung et al. | 188/284 X |
| 4,905,799 | 3/1990 | Yamaoka et al. | 188/322.22 X |
| 5,193,832 | 3/1993 | Wilson et al. . | |
| 5,193,833 | 3/1993 | Reisinger . | |
| 5,269,549 | 12/1993 | Wilson et al. . | |

FOREIGN PATENT DOCUMENTS

| | | | |
|---|---|---|---|
| 173984 | 2/1953 | Germany | 267/294 |
| 457042 | 12/1950 | Italy | 267/294 |
| 968528 | 10/1982 | U.S.S.R. | 267/141.1 |

Primary Examiner—Mark T. Le
Assistant Examiner—Lee W. Young
Attorney, Agent, or Firm—Thomas I. Rozsa; Tony D. Chen

[57] ABSTRACT

A shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like. The shock-absorbing apparatus comprises a telescoping assembly including a tube and a compression rod slidably engaged coaxially, and a compression elastomer assembly including resilient and deformable compression elastomers and rigid multi-function sleeves. The elastomers are placed coaxially between the tube and the compression rod, and interconnected by the sleeves. Each multi-function sleeve has a cylindrical sidewall defining a hollow chamber for interconnecting through press-fit engagement the elastomers in a stacked series and regulating the elastomers to prevent them from twisting or snaking when they are compressed. Each multi-function sleeve further has an integral internal structure for preventing relative movement along the coaxial direction between the sleeve and adjacent elastomers.

13 Claims, 10 Drawing Sheets

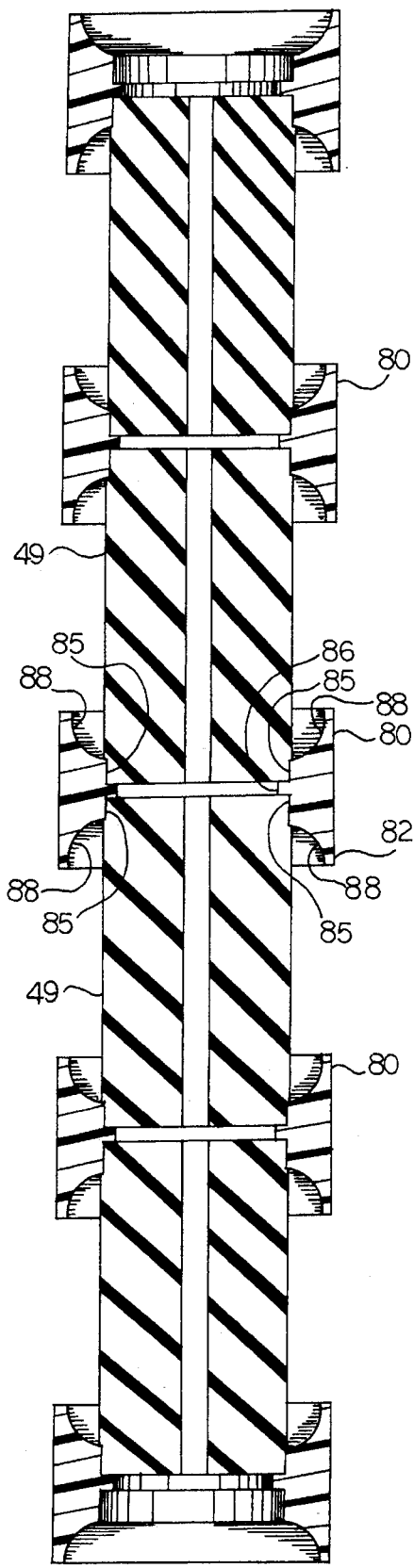
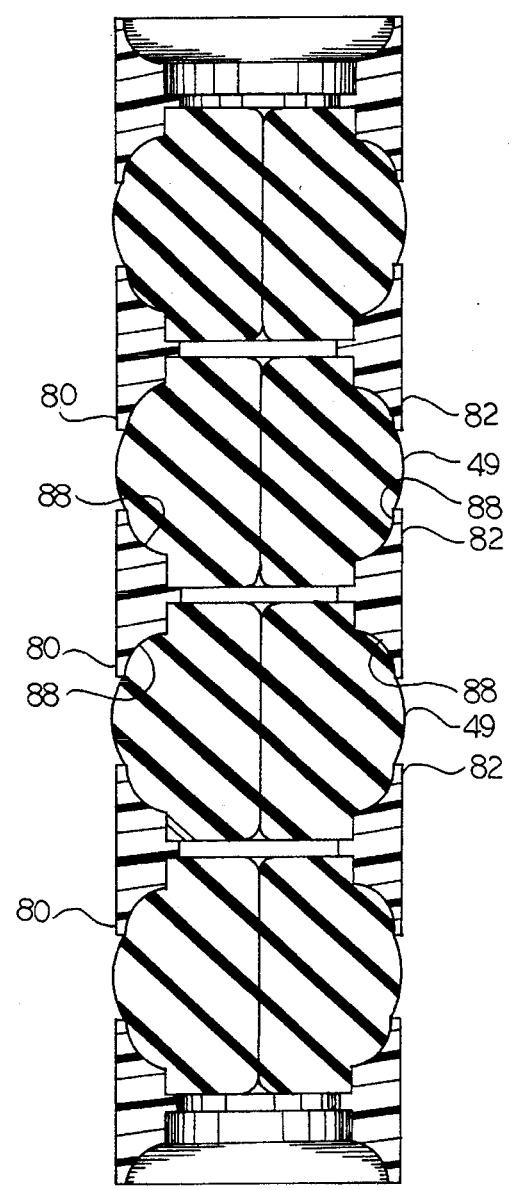
FIG. 25
FIG. 26

MULTI-FUNCTION SLEEVES USED IN CONJUNCTION WITH REPLACEABLE ELASTOMERS FOR ADJUSTABLE SHOCK-ABSORBING SUSPENSION SYSTEMS OF BICYCLES AND MOTORCYCLES

BACKGROUND OF THE INVENTION

1. Field of the Invention

The present invention relates to the field of shock-absorbing devices. More particularly the present invention relates to the field of shock absorbing suspension systems for bicycles and motorcycles.

2. Description of the Prior Art

Shock-absorbing devices have long been utilized in bicycles, motorcycles and like vehicles. Particularly, shock-absorbing suspension systems have been used in the front and rear fork assemblies and other body parts, such as the seat support structure, of bicycles and motorcycles.

Shock-absorbing suspension systems incorporated in the body frames of bicycles and motorcycles include primarily three basic models: the mechanic model which utilizes metal coil springs, the hydraulic model which utilizes oil-dampers, and the elastomer model which utilizes resilient rubber elastomers. The present invention is a new development of the elastomer model.

The following six (6) prior art patents are found to be pertinent to the elastomer model of the shock-absorbing suspension systems utilized in the body frame of bicycles and motorcycles:

1. U.S. Pat. No. 2,683,034 issued to Seddon on Jul. 6, 1954 for "Rubber Compression Spring" (hereafter "the '034 Seddon Patent").
2. U.S. Pat. No. 2,683,044 issued to Seddon on Jul. 6, 1954 for "Shock-Absorbing Device" (hereafter "the '044 Seddon Patent").
3. U.S. Pat. No. 2,708,112 issued to Seddon on May 10, 1955 for "Shock Absorbers" (hereafter "the '112 Seddon Patent").
4. U.S. Pat. No. 5,193,832 issued to Wilson et al. on Mar. 16, 1993 for "Suspension for Bicycles" (hereafter "the '832 Wilson Patent").
5. U.S. Pat. No. 5,193,833 issued to Reisinger on Mar. 16, 1993 for "Bicycle Front Suspension, Steering & Braking System" (hereafter "the Reisinger Patent").
6. U.S. Pat. No. 5,269,549 issued to Wilson et al. on Dec. 14, 1993 for "Suspension for Bicycles" (hereafter "the '549 Wilson Patent").

The '034 and '044 Seddon Patents have disclosed a rubber compression device for motorcycle front fork suspension systems. The compression device includes a telescoping system comprised of an outer tube and an inner tube. The inner tube is slidably engaged with the outer tube. A strut is placed inside the outer tube and extends into the inner tube. A set of rubber elastomers are placed between the strut and the inner tube. When the telescoping system is compressed, the strut moves into the inner tube and compresses on the rubber elastomers, which function as shock-absorbers. The set of rubber elastomers are skewered on a skewer rod.

The '112 Seddon Patent has disclosed a shock-absorbing device which also includes a telescoping system. The telescoping system comprises an outer tube and an inner tube slidably engaged with the outer tube. A compression elastomer is placed inside the outer tube between the proximal end of the inner tube and the distal end of the outer tube and skewered on a skewer rod. The distal end of the skewer rod is attached to the distal end of the outer tube, and the proximal end of the skewer rod extends into the proximal end of the inner tube. A rebound elastomer is placed inside the inner tube between the proximal end of the inner tube and the proximal end of the skewer rod and also skewered on the skewer rod. This arrangement makes the compression elastomer function as a shock-absorber when the inner tube moves into the outer tube, and the rebound elastomer as a shock-absorber when the inner tube moves out from the outer tube.

The '832 and '549 Wilson Patents have disclosed a suspension system for bicycle front forks. The bicycle front fork has two telescoping legs each utilizing a suspension system. The telescoping suspension system includes an upper tube and an lower strut. A set of elastomers are placed between the upper tube and the lower strut and skewered on a skewer rod. The elastomers function as a shock absorber when the telescoping suspension system is compressed. The '549 Wilson Patent has further disclosed that the end of the skewer rod can have a flange so that when the skewer rod is removed, the elastomers can be held on the skewer rod without filling off.

The Reisinger Patent has disclosed a bicycle front suspension, steering and braking system. The suspension system includes an upper tube and a lower strut slidably engaged with the upper tube. A set of elastomers are placed between the upper tube and the lower strut and separated by a set of solid discs. Each solid disc is placed between adjacent ones of the elastomers and has a top surface perpendicular to its rotational axial. Each elastomer further has a center bore, and each solid disc further has a center protrusion extending along the rotational axis of the disc out from the top surface of the disc and received within the center bore of the adjacent elastomer. This feature is designed to limit the ultimate compression, or in the words of the industry, to prevent "bottoming out", of the suspension system, because the protrusions of all the disks function as a solid rod between the upper tube and the lower strut when the telescoping suspension system is fully compressed.

In modern bicycles and motorcycles, it is highly desirable for the individual riders to have the ability to modify the configuration of the elastomers to adjust the compressibility of the shock-absorbing devices. Earlier prior art devices do not provide this flexibility. For example, in the '034, '044 and '112 Seddon Patents, the configuration of the elastomers are fixed by the manufacturer and individual riders cannot modify the configurations of the elastomers without completely disassembling the telescoping suspension system.

Recent prior art devices are designed and constructed to provide the flexibility for the individual riders to modify configuration of the set of the elastomers to adjust the compressibility of the shock-absorbing devices. For example, in the Reisinger Patent, a rider may theoretically modify the configuration of the elastomers by opening the top cap of the telescoping suspension system, taking the elastomers out and replacing part or all of them with other elastomers which have different compressibility. However, this cannot be easily done because the elastomers in the Reisinger Patent are disconnected from each other and a rider has to turn the bicycle upside-down to take the elastomers out of the tube.

The '832 and '549 Wilson Patents have utilized a removable skewer rod for interconnecting the elastomers to avoid the problem that a rider has to turn the bicycle upside-down to remove the elastomers out of the tube. All the elastomers are skewered on the skewer rod, which is attached to the top cap of the telescope suspension assembly. A rider can open the top cap and readily remove the skewer with all the elastomers skewered thereon. However, this skewer design sometimes makes replacement of the elastomers a time consuming and laborious process. For example, a typical elastomer set includes six (6) elastomers, as shown in the '832 and '549 Wilson Patent. If a rider wants to replace the top elastomer, the rider has to take all five lower elastomers off the skewer rod before the top elastomer can be replaced, and after the replacement of the top elastomer, all these five lower elastomers have to be placed back onto the skewer rod.

Therefore, it is always desirable to design and construct a new shock-absorbing suspension system for bicycles and motorcycles which can eliminate the above-mentioned disadvantages in the prior art devices, while still providing the rider with all the desired functions and features.

SUMMARY OF THE INVENTION

The present invention is a shock-absorbing device for the body frames of bicycles and motorcycles. The shock-absorbing device comprises a multiplicity of multi-function sleeves used in conjunction with replaceable elastomers for adjustable shock-absorbing suspension systems utilized in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis, etc.

It is known that various devices have been utilized for shock-absorbing purposes in bicycle and motorcycle suspension systems. These various shock-absorbing devices may utilize metal coil springs, oil-dampers, or rubber elastomers, or the combination thereof.

It is also known that in the elastomer model of shock-absorbing systems, one or more elastomers may be placed between two telescoping members which typically includes an outer tube and an inner strut or an inner tube. When the two telescoping members move towards each other, the elastomers are compressed and function as shock absorbers. Typically the elastomers are cylindrical shaped to accommodate the interior configuration of the telescoping tubes.

It is further known that elastomers may be loosely placed within the telescoping tube, or skewered on a skewer rod. When the elastomers are loosely placed within the telescoping tube, they may be separated by small solid discs. When the elastomers are skewered on a skewer rod, the skewer rod may have a flanged bottom end for preventing the elastomers from falling off. The use of the skewer rod requires the elastomers to have a through bore.

However, it has been discovered, according to the present invention, that when the elastomers are skewered on a skewer rod, it is sometimes a very laborious and time consuming process to replace the elastomers, particularly the upper elastomers. On the other hand, when the elastomers are loosely placed within the telescoping tube, a rider has to turn the bicycle or motorcycle upside-down to take the elastomers out of the telescoping tube for the purpose of modifying the configuration of the elastomers. This is particularly difficult when the rider has a heavy motorcycle.

It has therefore been discovered, according to the present invention, that if a multiplicity of generally cylindrical shaped multi-function sleeves are used in conjunction with the cylindrical elastomers, where each multi-function sleeve is positioned between and interconnects two adjacent elastomers, then all the elastomers can be removed together in an interconnected series, while each individual elastomer can be replaced without disturbing or disconnecting other elastomers.

It has further been discovered, according to the present invention, that if the multiplicity of elastomers are interconnected by the multi-function sleeves, then the rigid multi-function sleeves function as regulators and restrainers to the stacked resilient elastomers to prevent the stack of elastomers from twisting and snaking when they are compressed.

It has also been discovered, according to the present invention, that if each multi-function sleeve placed between two adjacent elastomers is interconnecting the two elastomers by press-fit engagement based upon the resiliency of the rubber elastomers, then the press-fit can be tight enough to withhold the weight of the interconnected series of the elastomers and sleeves, but still allows each removal of any one of the two elastomers from the multi-function sleeve.

It has further been discovered, according to the present invention, that if each generally cylindrical shaped multi-function sleeve placed between two adjacent cylindrical elastomers has a hollow cylindrical chamber which is accessible from both of the two opposite ends of the multi-function sleeve, then the adjacent ends of the two cylindrical shaped elastomers can be press-fit into the hollow cylindrical chamber of the multi-function sleeve respectively from the two opposite ends of the multi-function sleeve, which can provide the desired interconnection between the two elastomers while still providing the flexibility of replacing any one of the elastomers individually.

It has additionally been discovered, according to the present invention, that if each multi-function sleeve placed between two adjacent elastomers has an internal partition located inside its hollow cylindrical chamber, then the internal partition will prevent any relative sliding movement among the multi-function sleeve and the two adjacent elastomers.

It has also been discovered, according to the present invention, that if the internal partition inside the hollow cylindrical chamber of each multi-function sleeve is configured as a circular internal shelf, then the weight and material cost of the multi-function sleeve are reduced.

It has further been discovered, according to the present invention, that if the exterior cylindrical sidewall of each multi-function sleeve has an annular groove, then the weight and material cost of the multi-function sleeve are further reduced and the annular groove can better facilitate the handling of the multi-function sleeves.

It has additionally been discovered, according to the present invention, that if each generally cylindrical shaped multi-function sleeve placed between two adjacent elastomers has a circular bevel surface at each of its two opposite ends converging into the hollow cylindrical chamber of the multi-function sleeve, then the circular bevel surface can better accommodate the drum shaped elastomers when they are compressed.

It has been further discovered, according to the present invention, that if each generally cylindrical shaped multi-function sleeve placed between two adjacent elastomers has a circular bowl-shaped surface at each of its two opposite ends converging into the hollow cylindrical chamber of the multi-function sleeve, then the circular bowl-shaped surface can further allow the elastomers to expand when they are compressed.

It is therefore an object of the present invention to provide a new design and construction of a shock-absorbing suspension system utilizing a multiplicity of generally cylindrical shaped compressible elastomers, where the configuration of the elastomers assembly can be quickly and easily modified to adjust the compressibility of the shock-absorbing suspension system.

It is also an object of the present invention to provide a new design and construction of a shock-absorbing suspension system utilizing a multiplicity of generally cylindrical shaped multi-function sleeves in conjunction with the cylindrical elastomers, where each multi-function sleeve is positioned between two adjacent elastomers and functions to interconnect the two adjacent elastomers, so that all the elastomers can be removed together in an interconnected series, while each individual elastomer can be replaced without disturbing or disconnecting other elastomers.

It is a further object of the present invention to provide a new design and construction of a shock-absorbing suspension system utilizing a multiplicity of rigid multi-function sleeves in conjunction with the resilient elastomers, where the multiplicity of elastomers are interconnected by the multi-function sleeves, so that the rigid multi-function sleeves function as regulators and restrainers to the stacked resilient elastomers to prevent the stack of elastomers from twisting and snaking when they are compressed.

It is also an object of the present invention to provide a new design and construction of a shock-absorbing suspension system utilizing a multiplicity of generally cylindrical shaped multi-function sleeves in conjunction with the cylindrical elastomers, where each multi-function sleeve placed between two adjacent elastomers is interconnecting the two elastomers by press-fit engagement based upon the resiliency of the rubber elastomers, so that the press-fit can be tight enough to withhold the weight of the interconnected series of the elastomers and sleeves, but still allows each removal of any one of the two elastomers from the multi-function sleeve.

It is a further object of the present invention to provide a new design and construction of a shock-absorbing suspension system utilizing a multiplicity of generally cylindrical shaped multi-function sleeves in conjunction with the cylindrical elastomers, where each multi-function sleeve which is placed between two adjacent cylindrical elastomers has a hollow cylindrical chamber which is accessible from both of the two opposite ends of the multi-function sleeve, so that the adjacent ends of the two cylindrical shaped elastomers can be press-fit into the hollow cylindrical chamber of the multi-function sleeve respectively from the two opposite ends of the multi-function sleeve, which can providing the desired interconnection between the two elastomers while still provide the flexibility of replacing any one of the elastomers individually.

It is an additional object of the present invention to provide a new design and construction of a shock-absorbing suspension system utilizing a multiplicity of generally cylindrical shaped multi-function sleeves in conjunction with the cylindrical elastomers, where each multi-function sleeve placed between two adjacent elastomers has an internal partition located inside its hollow cylindrical chamber, so that the internal partition will prevent any relative sliding movement among the multi-function sleeve and the two adjacent elastomers.

It is another object of the present invention to provide a new design and construction of a shock-absorbing suspension system utilizing a multiplicity of generally cylindrical shaped multi-function sleeves in conjunction with the cylindrical elastomers, where the internal partition inside the hollow cylindrical chamber of each multi-function sleeve is configured as a circular internal shelf, so that the weight and material cost of the multi-function sleeve are reduced.

It is a further object of the present invention to provide a new design and construction of a shock-absorbing suspension system utilizing a multiplicity of generally cylindrical shaped multi-function sleeves in conjunction with the cylindrical elastomers, where the exterior cylindrical sidewall of each multi-function sleeve has an annular groove, so that the weight and material cost of the multi-function sleeve are further reduced and the annular groove can better facilitate the handling of the multi-function sleeves.

It is an additional object of the present invention to provide a new design and construction of a shock-absorbing suspension system utilizing a multiplicity of generally cylindrical shaped multi-function sleeves in conjunction with the cylindrical elastomers, where each multi-function sleeve placed between two adjacent elastomers has a circular bevel surface at each of its two opposite ends converging into the hollow cylindrical chamber of the multi-function sleeve, so that the circular bevel surface can better accommodate the drum shaped elastomers when they are compressed.

It is an additional object of the present invention to provide a new design and construction of a shock-absorbing suspension system utilizing a multiplicity of generally cylindrical shaped multi-function sleeves in conjunction with the cylindrical elastomers, where each generally cylindrical shaped multi-function sleeve placed between two adjacent elastomers has a circular bowl-shaped surface at each of its two opposite ends converging into the hollow cylindrical chamber of the multi-function sleeve, so that the circular bowl-shaped surface can further allow the elastomers to expand when they are compressed.

Described generally, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like.

The shock-absorbing apparatus comprises a telescoping assembly which includes a generally hollow cylindrical shaped elongated tube and a generally cylindrical shaped elongated compression rod, the tube and the compression rod each having a proximal end and a distal end, the tube and compression rod further slidably engaged coaxially with the proximal end of the compression rod extending inside the tube.

The shock-absorbing apparatus also comprises a compression elastomer assembly which includes a multiplicity of generally cylindrical shaped resilient and deformable compression elastomers and a multiplicity of generally hollow cylindrical shaped rigid multi-function sleeves, the compression elastomers placed coaxially inside the hollow tube and between the distal end of the tube and the proximal end of the compression rod, and each multi-function sleeve having two opposite ends and positioned between two adjacent compression elastomers.

Each multi-function sleeve has a generally cylindrical shaped circumferential sidewall with an exterior surface and an interior surface, the interior surface defining a generally cylindrical hollow chamber which is accessible from both the two opposite ends of the each multi-function sleeve, the internal diameter of the hollow chamber being slightly less than the external diameter of the two adjacent compression elastomers. In one embodiment, the multi-function sleeve has a generally "H" shaped cross-sectional configuration. In another embodiment, the multi-function sleeve has a generally hourglass shaped cross-sectional configuration.

The multiplicity of rigid multi-function sleeves interconnect the multiplicity of resilient elastomers in a stacked series and regulate the elastomers to prevent them from twisting or snaking when being compressed, where the two adjacent compression elastomers are interconnected by each multi-function sleeve at its the two opposite ends respectively through press-fit engagement, as an end portion of each of the adjacent compression elastomer extends into the hollow chamber of the multi-function sleeve from a respective end thereof, and is engaged through press-fit with the interior surface of the sidewall of the multi-function sleeve. Each multi-function sleeve further has means for preventing relative movement along the coaxial direction between the rigid multi-function sleeve and the adjacent resilient elastomers.

The shock-absorbing apparatus additionally comprises an end cap assembly which is removably attached to the distal end of the elongated tube and having an adaptor with an end socket to engage through press-fit with a first one of the multiplicity of elastomers which is closest to the distal end of the tube for removal of the compression elastomer assembly as one unit attached to the end cap assembly.

In the present invention shock-absorbing apparatus, the multiplicity of rigid multi-function sleeves interconnect and regulate the compression of the multiplicity of resilient elastomers, the multiplicity of resilient elastomers can be removed as an interconnected stacked series, and the press-fit between the rigid sleeves and the resilient elastomers allows each elastomer to be replaced individually without disturbing or disconnecting other interconnected elastomers.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 3 is a perspective view showing the multi-function sleeves of the present invention used in conjunction with replaceable elastomers such that all the elastomers can be removed together in an interconnected series, while each individual elastomer can be replaced without disturbing or disconnecting other elastomers.

FIG. 25 s an enlarged partial cross-sectional view showing that the uncompressed elastomers are interconnected by the multi-function sleeves shown in FIG. 20.

FIG. 26 is an enlarged partial cross-sectional view showing that the compressed elastomers are regulated and restrained by the multi-function sleeves and prevented from twisting and snaking, and the drum shaped compressed elastomers are further accommodated by the bowl-shaped surfaces of the multi-function sleeves shown in FIG. 20.

DESCRIPTION OF THE PREFERRED EMBODIMENT

Although specific embodiments of the present invention will now be described with reference to the drawings, if should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
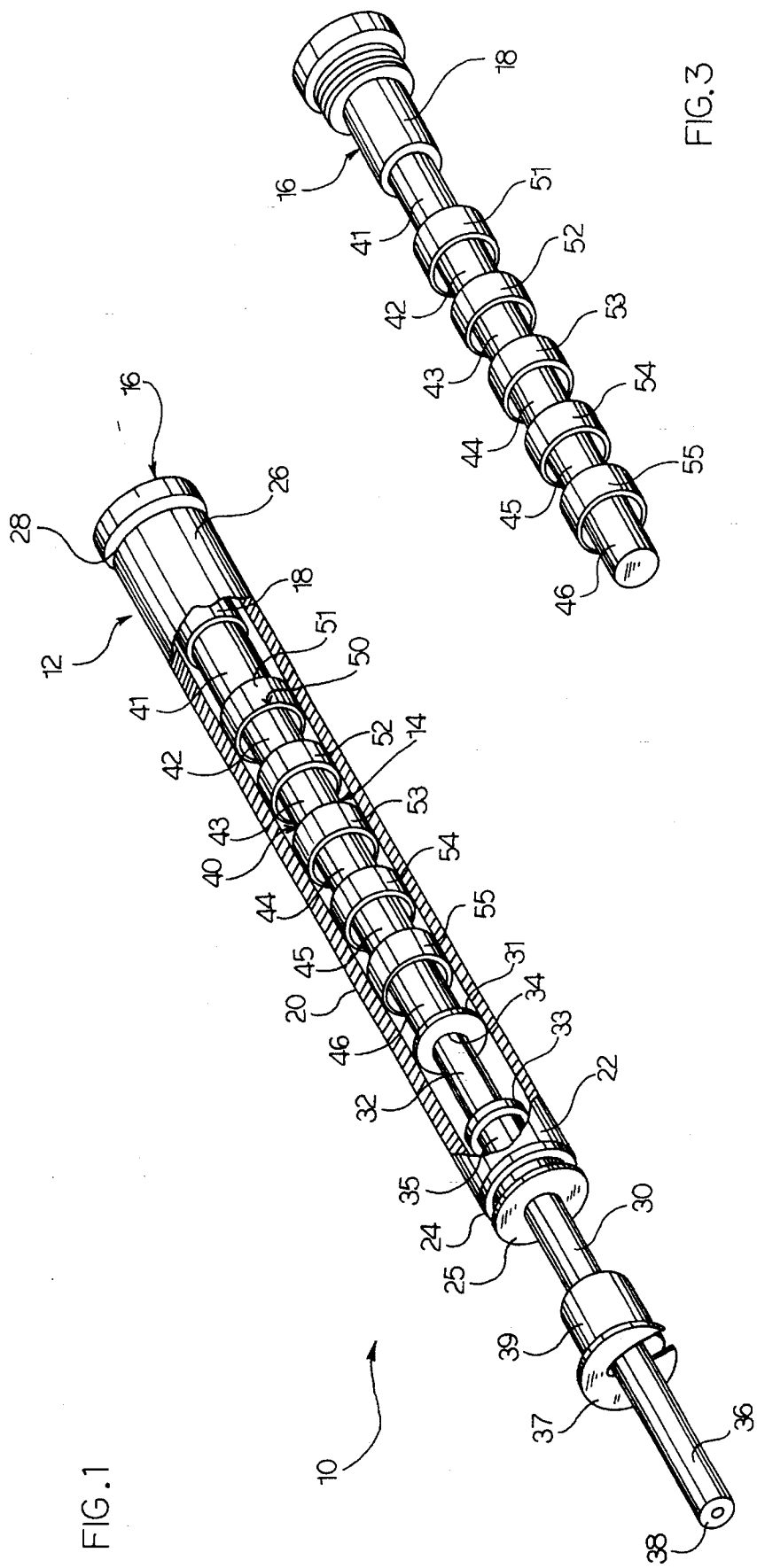
FIG. 1 is a partial cut-away perspective view of the present invention shock-absorbing device for the body frames of bicycles and motorcycles.

Referring to FIG. 1, there is shown at 10 the present invention shock-absorbing apparatus for use in the body frames of light-weight pedal-powered or motor-powered land or water surface vehicles and sports and exercising equipment. These light-weight pedal-powered or motor-powered land or water surface vehicles and sports and exercising equipment include, but are not limited to, bicycles, dirt bikes, off-road bikes, all terrain bikes, exercise bikes, motor-bikes, motorcycles, mopeds, scooters, snow-scooters, snow-mobiles, jet-skis and the like.

Figure 2:
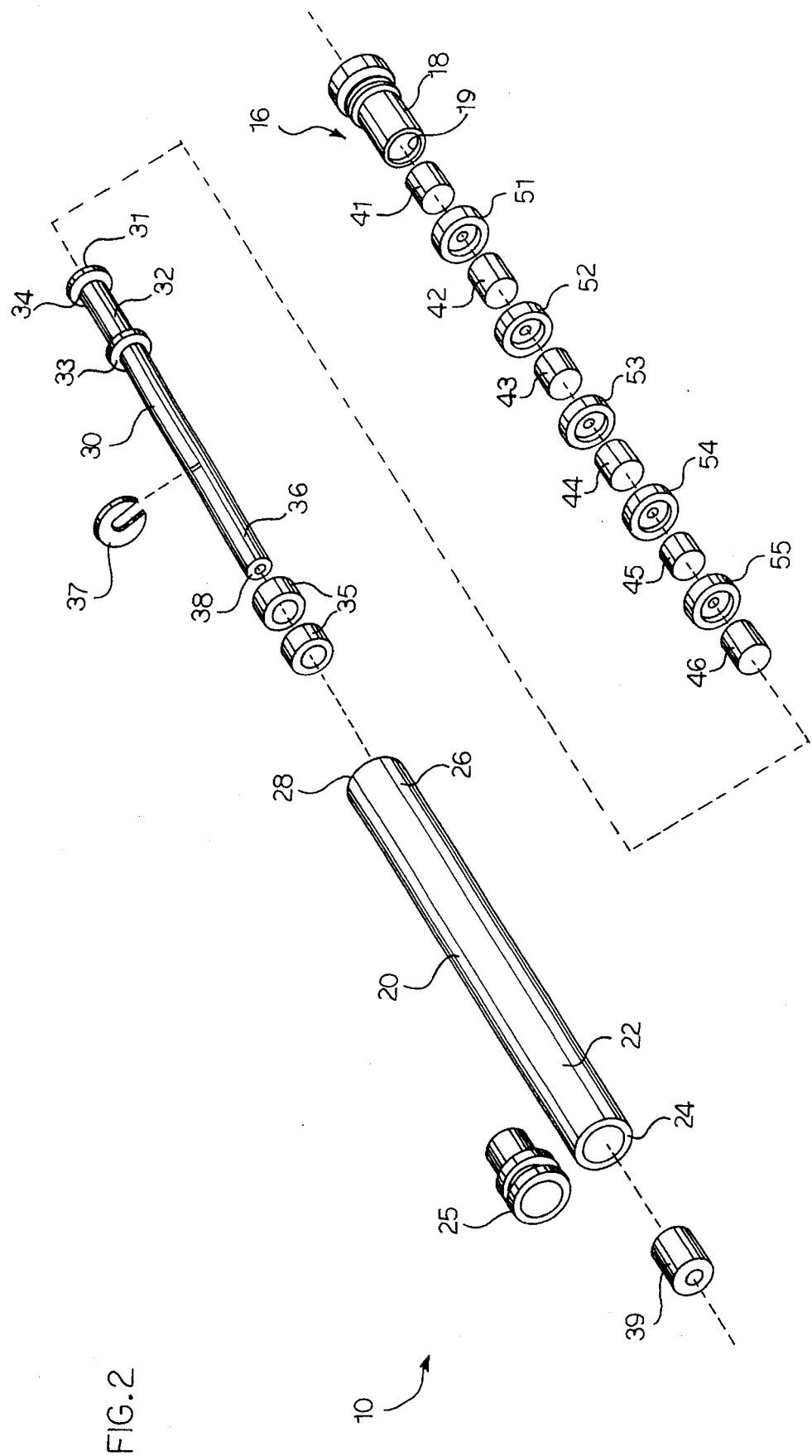
FIG. 2 is an exploded perspective view of the present invention shock-absorbing device for the body frames of bicycles and motorcycles.
Figure 4:
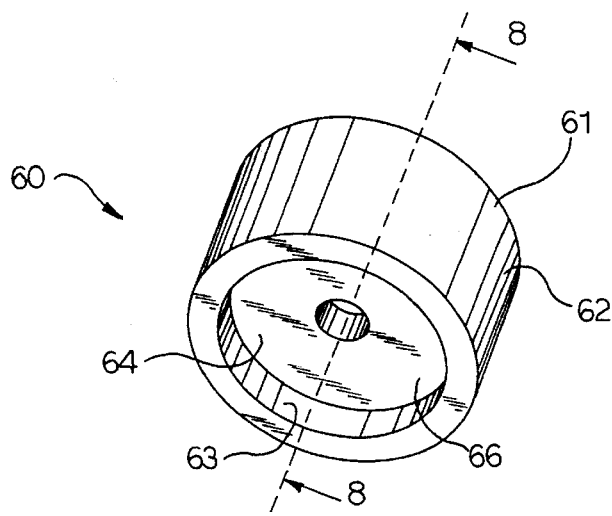
FIG. 4 is a perspective view showing one embodiment of the present invention multi-function sleeve used in conjunction with replaceable elastomers for adjustable shock-absorbing device for the body frames of bicycles and motorcycles.
Figure 5:
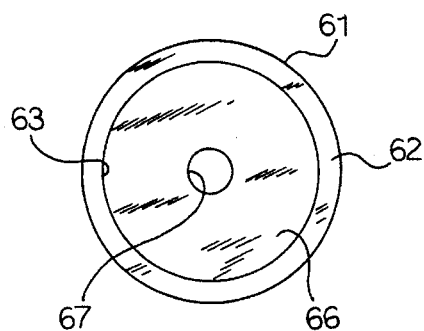
FIG. 5 is a top plan view of the multi-function sleeve shown in FIG. 4.
Figure 7:
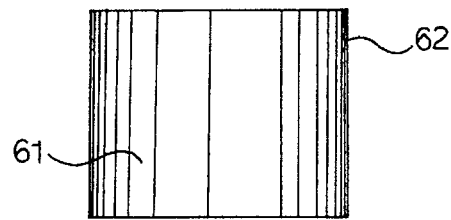
FIG. 7 is a side elevation view of the multi-function sleeve shown in FIG. 4.
Figure 6:
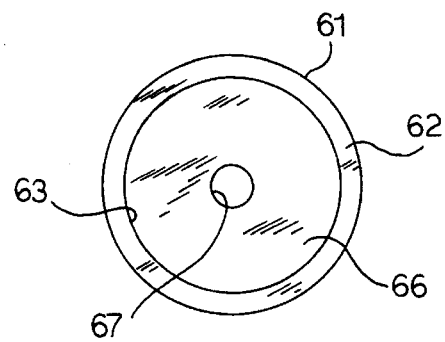
FIG. 6 is a bottom plan view of the multi-function sleeve shown in FIG. 4.
Figure 8:
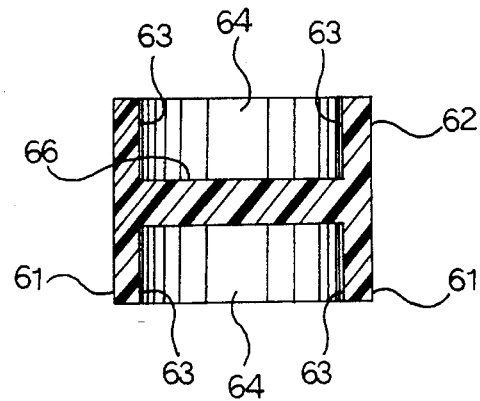
FIG. 8 is a cross-sectional view taken along line 8—8 of FIG. 4.

Referring to FIGS. 1 through 3, the shock-absorbing apparatus 10 comprises a telescoping assembly 12. The telescoping assembly 12 includes a generally cylindrical shaped elongated hollow tube 20 and a generally cylindrical shaped elongated compression rod 30. The hollow cylindrical tube 20 has a proximal end portion 22 which terminates at a proximal end 24, and a distal end portion 26 which terminates at a distal end 28. The compression rod also has a proximal end portion 32 which terminates at a proximal end 34, and a distal end portion 36 which terminates at a distal end 38. The hollow tube 20 and the compression rod 30 are slidably engaged coaxially, where the proximal end portion 32 of the compression rod 30 is extending inside the tube 20 from the proximal end 24 of the tube 20. The proximal end 22 of the tube 20 has a bushing 25, and the proximal end 32 of the compression rod has a widened compression flange 31.

The shock-absorbing apparatus 10 also comprises a compression elastomer assembly 14. The compression elastomer assembly 14 includes a multiplicity of generally cylindrical shaped resilient and deformable compression elastomers 40 and a multiplicity of generally cylindrical shaped rigid hollow multi-function sleeves 50. Each multi-function sleeve has two opposite ends and is positioned between two adjacent compression elastomers.

The compression elastomers 40 are made of rubber or synthetic rubber material or like resilient and deformable materials. The number, hardness or compressibility, as well as the length of the elastomers may vary according to the desire of the individual user of the vehicle or equipment on which the present invention shock-absorbing apparatus 10 is utilized. In one preferred embodiment, there are six (6) equal-length compression elastomers 41, 42, 43, 44, 45 and 46 placed coaxially inside the hollow tube 20 and between the distal end 26 of the tube 20 and the proximal end 32 of the compression rod 30. Two of the six (6) elastomers 41, 42, 43, 44, 45 and 46 may be hard elastomers, two of them may be medium elastomers, and two of them may be soft elastomers. Accordingly, there are five (5) multi-function sleeves 51, 52, 53, 54 and 55 placed between the six (6) elastomers 41, 42, 43, 44, 45 and 46.

It should be noted that any examples given in this specification are merely for the purpose of illustration only. They shall not be construed as to place any limitation on the variations of the present invention.

Referring to FIGS. 4 through 8, there is shown at 60 one embodiment of the present invention multi-function sleeves. The multi-function sleeve 60 has a cylindrical circumferential sidewall 62. The cylindrical circumferential sidewall 62 has an exterior surface 61 and an interior surface 63. The interior surface 63 of the sidewall 62 defines a hollow cylindrical chamber 64 which is accessible from both of the two opposite ends of the multi-function sleeve 60. The multi-function sleeve 60 further has an integral internal partition 66 located inside the hollow chamber 64. In general, the multi-function sleeve 60 has a generally "H" shaped cross-sectional configuration.

Figure 9:
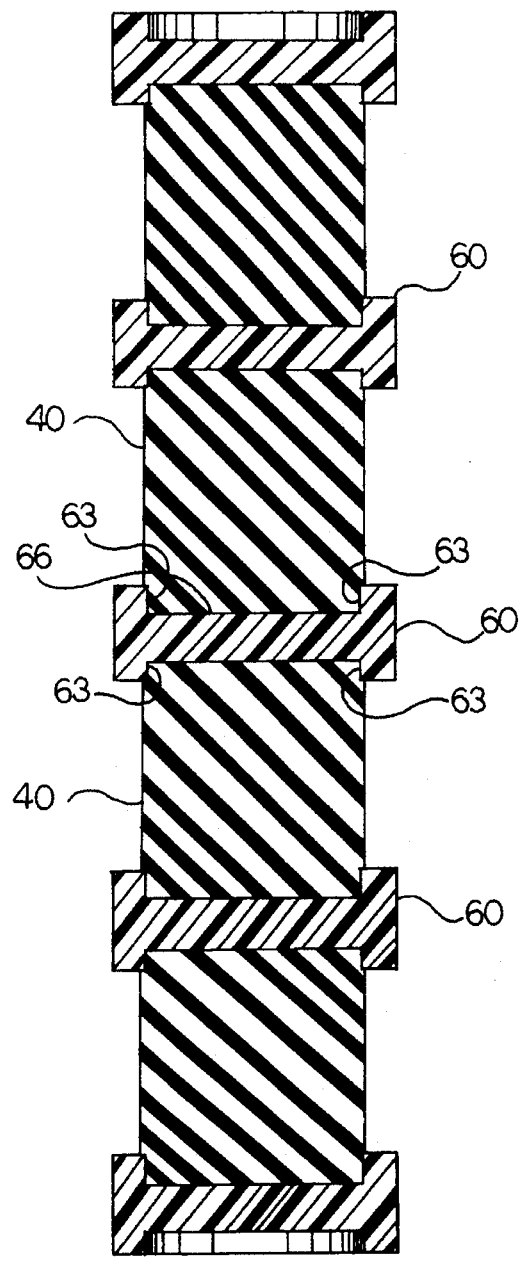
FIG. 9 is an enlarged partial cross-sectional view showing that the uncompressed elastomers are interconnected by the multi-function sleeves.
Figure 10:
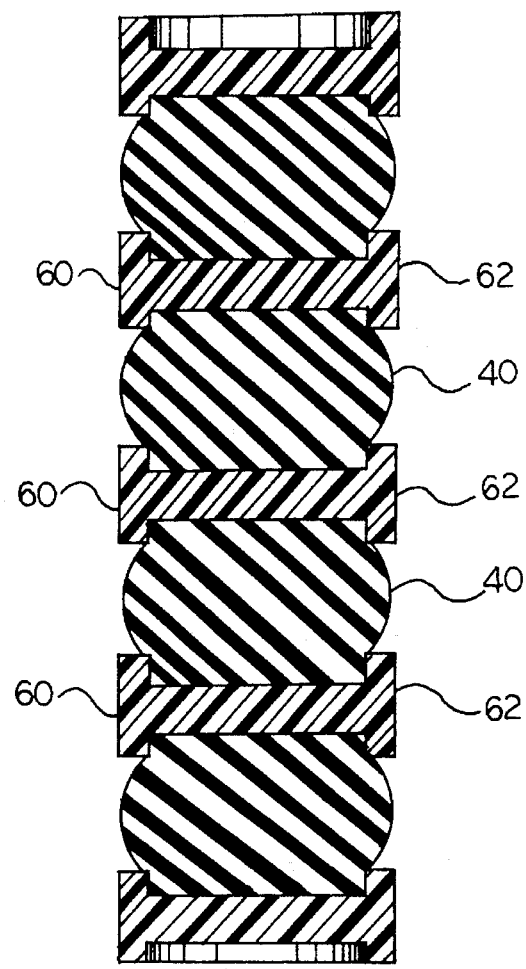
FIG. 10 is an enlarged partial cross-sectional view showing that the compressed elastomers are regulated and restrained by the multi-function sleeves shown in FIG, 4 and prevented from twisting and snaking.
Figure 11:
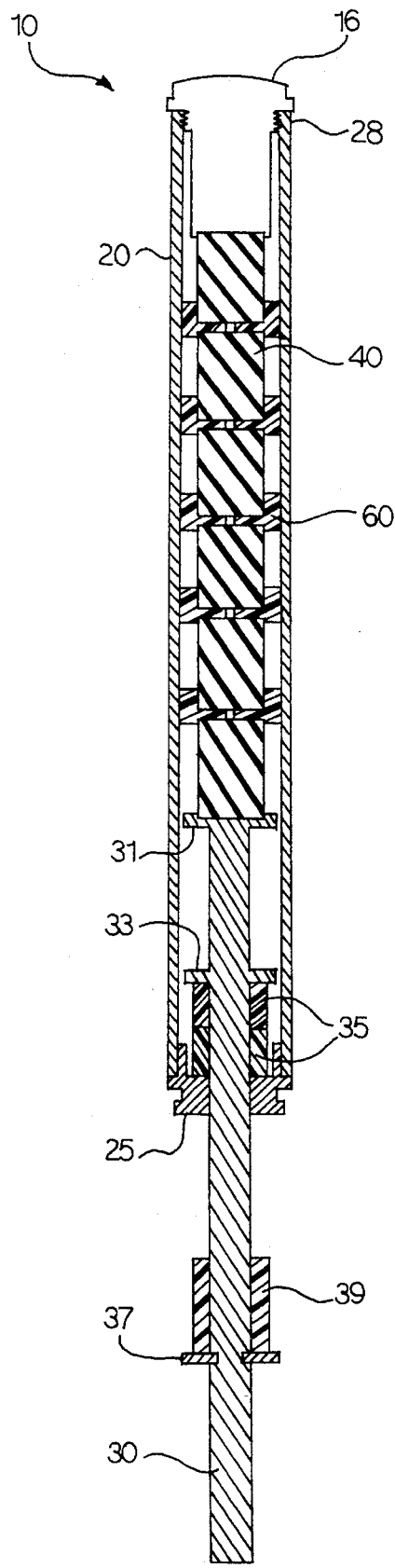
FIG. 11 is a cross-sectional view of the present invention shock-absorbing device for the body frames of bicycles and motorcycles utilizing the multi-function sleeves shown in FIG. 4 in conjunction with the multiplicity of elastomers.

Referring to FIGS. 9 through 11, the rigid multi-function sleeves 60 serve to interconnect the resilient elastomers 40 in a stacked series. The rigid multi-function sleeves 60 also serve to regulate the elastomers 40 to prevent them from twisting or snaking when they are compressed.

More particularly, as shown in FIG. 9, two adjacent compression elastomers 40 are interconnected by one multi-function sleeve 60 at its two opposite ends respectively through press-fit engagement, where the internal diameter of the hollow chamber 64 of the sleeve 60 is slightly less than the external diameter of the two adjacent elastomers 40. As the end portion of the adjacent elastomers 40 extend into the hollow chamber 64 of the multi-function sleeve 60, the adjacent elastomers 40 are engaged through press-fit with the interior surface 63 of the sidewall 62 of the sleeve 60, and abutted by the internal partition 66 which prevents relative movement along the coaxial direction between the sleeve 60 and the adjacent elastomers 40.

Furthermore, as shown in FIG. 10, as the resilient elastomers 40 are compressed, each elastomer 40 deforms into a generally drum shaped configuration which fills the gap between the sidewalls 62 of the rigid sleeves 60. This feature prevents any hard contact between the sidewalls 62 of adjacent rigid sleeves 60.

As shown in FIG. 11, the series of resilient elastomers 40 are maintained in a coaxial stack along the axial direction of the tube 20 by the multi-function sleeves 60 Without the multi-function sleeves 60, it will be hard to maintain the coaxial alignment of the elastomers 40, and when the elastomers are compressed, bending, twisting, bending and snaking are very likely to occur.

Referring to FIGS. 12 through 16, there is shown at 70 another embodiment of the present invention multi-function sleeves. The multi-function sleeve 70 also has a cylindrical circumferential sidewall 72. The cylindrical circumferential sidewall 72 again has an exterior surface 71 and an interior surface 73, where the interior surface 73 of the sidewall 72 defines a hollow chamber 74 which is accessible from both the two opposite ends of the multi-function sleeve 70.

However, the multi-function sleeve 70 now has an integral internal annular shelf 76 located inside the hollow chamber 74. This feature of having an annular shelf, rather than an internal partition, reduces the weight and material cost of the sleeve 70.

In addition, the multi-function sleeve 70 has a beveled surface 78 at each of its two opposite ends. The beveled surfaces 78 at both ends of the multi-function sleeve 70 converge into the hollow chamber 74 of the sleeve 70. This feature serves a function which will be discussed later.

Furthermore, the multi-function sleeve 70 has an external annular groove or channel 79. The annular groove or channel 79 is recessed from the exterior surface 71 of the sidewall 72 of the multi-function sleeve 70. It serves the function of facilitating handling of the sleeve 70. It also reduces the weight and material cost of the multi-function sleeve 70. Therefore, in general, the multi-function sleeve 70 has a generally hourglass shaped cross-sectional configuration.

Figure 19:
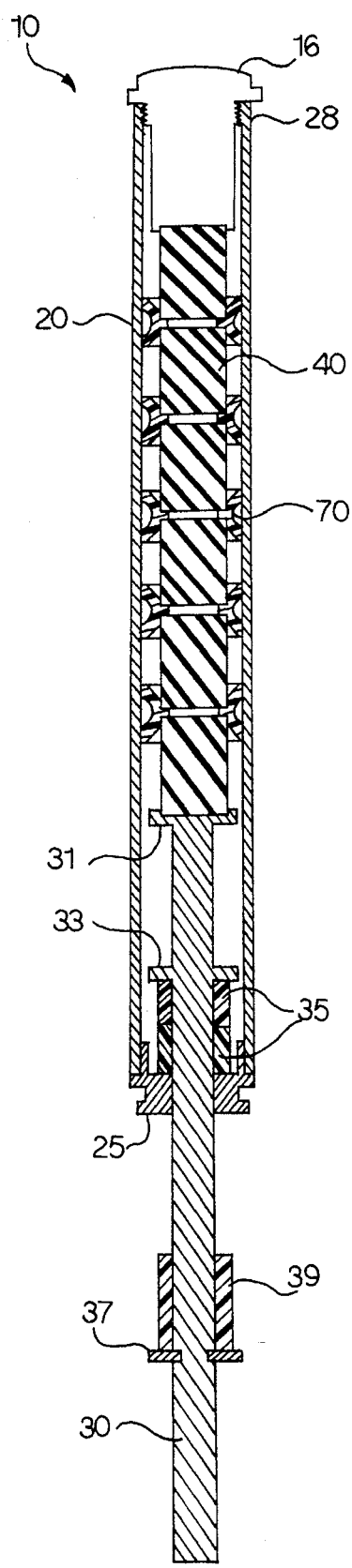
FIG. 19 is a cross-sectional view of the present invention shock-absorbing device for the body frames of bicycles and motorcycles utilizing the multi-function sleeves shown in FIG. 12 in conjunction with the multiplicity of elastomers.
Figure 12:
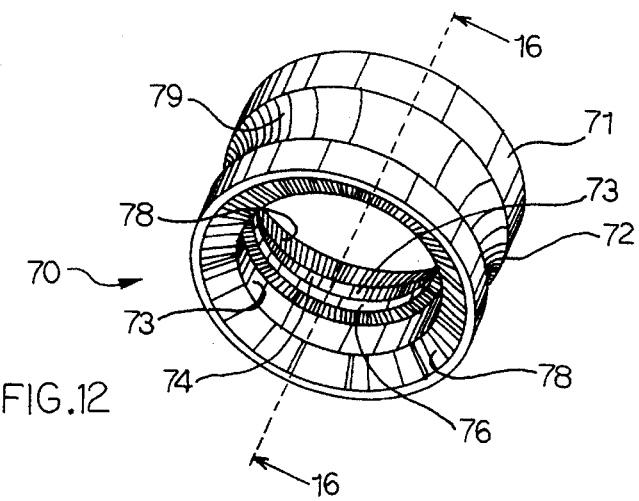
FIG. 12 is a perspective view showing another embodiment of the present invention multi-function sleeve used in conjunction with replaceable elastomers for adjustable shock-absorbing device for the body frames of bicycles and motorcycles.
Figure 13:
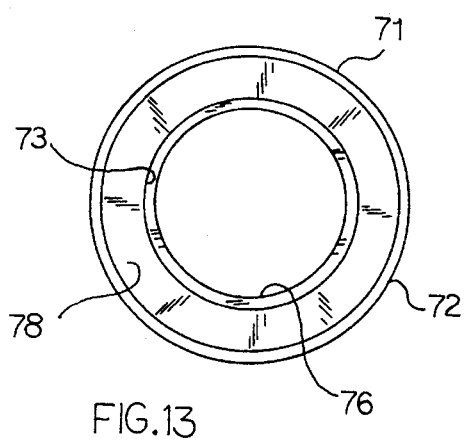
FIG. 13 is a top plan view of the multi-function sleeve shown in FIG. 12.
Figure 15:
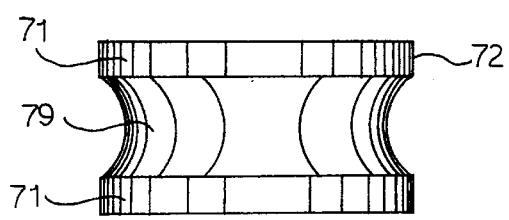
FIG. 15 is a side elevation view of the multi-function sleeve shown in FIG. 12.
Figure 14:
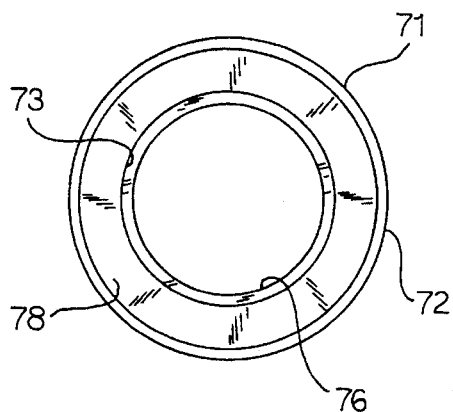
FIG. 14 is a bottom plan view of the multi-function sleeve shown in FIG. 12.
Figure 16:
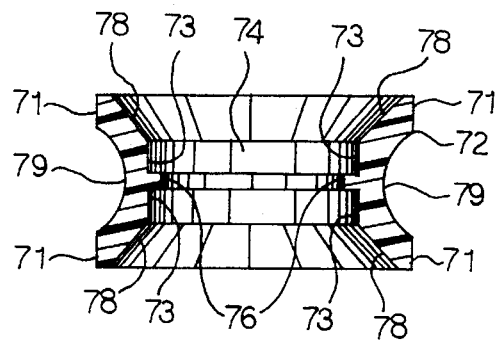
FIG. 16 is a cross-sectional view taken along line 16—16 of FIG. 12.
Figure 17:
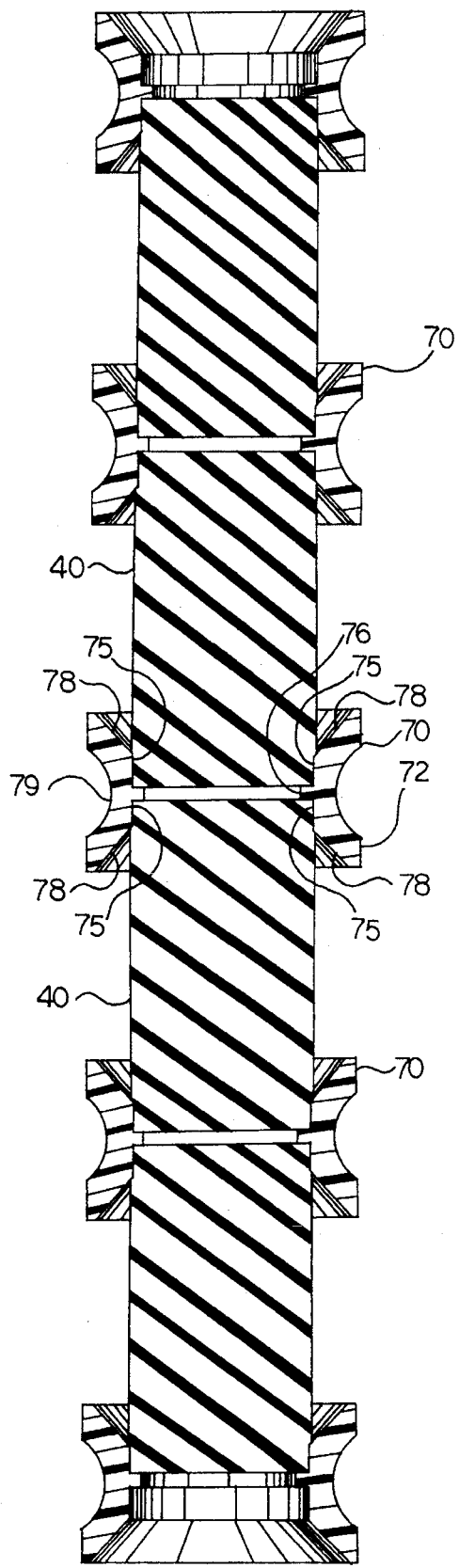
FIG. 17 is an enlarged partial cross-sectional view showing that the uncompressed elastomers are interconnected by the multi-function sleeves shown in FIG. 12.
Figure 18:
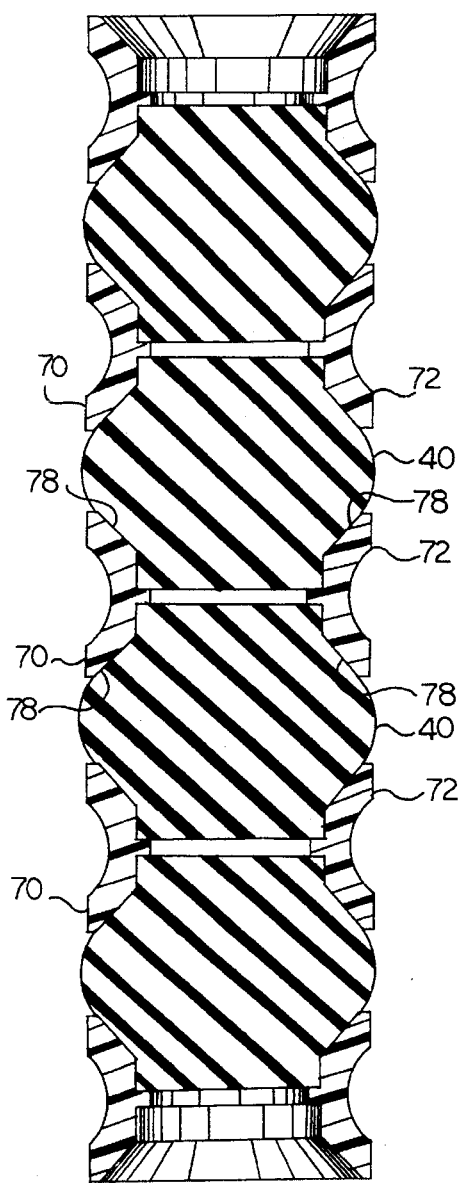
FIG. 18 is an enlarged partial cross-sectional view showing that the compressed elastomers are regulated and restrained by the multi-function sleeves and prevented from twisting and snaking, and the drum shaped compressed elastomers are well accommodated by the beveled surfaces of the multi-function sleeves shown in FIG. 12.
Figure 20:
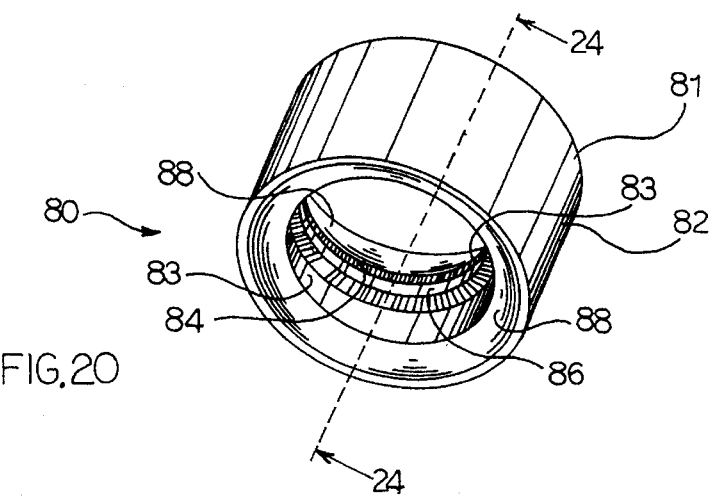
FIG. 20 is a perspective view showing still another embodiment of the present invention multi-function sleeve used in conjunction with replaceable elastomers for adjustable shock-absorbing device for the body frames of bicycles and motorcycles.
Figure 21:
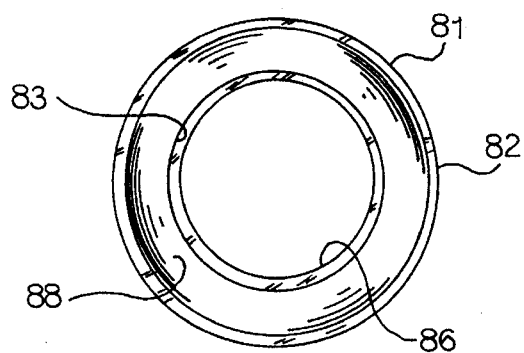
FIG. 21 is a top plan view of the multi-function sleeve shown in FIG. 20.
Figure 23:
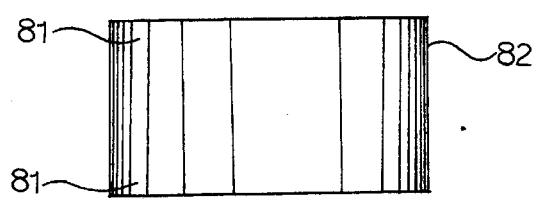
FIG. 23 is a side elevation view of the multi-function sleeve shown in FIG. 20.
Figure 22:
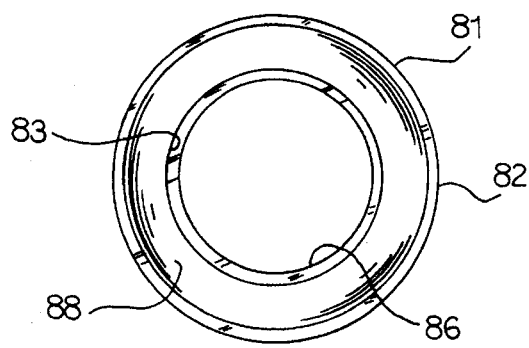
FIG. 22 is a bottom plan view of the multi-function sleeve shown in FIG. 20.
Figure 24:
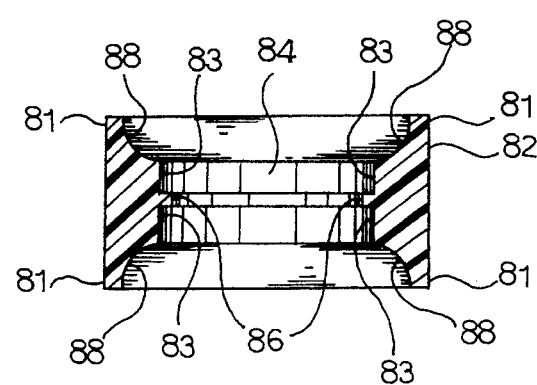
FIG. 24 is a cross-sectional view taken along line 24—24 of FIG. 20.

Referring to FIGS. 17 through 19, the rigid multi-function sleeves 70 again serve to interconnect the resilient elastomers 40 in a stacked series. The rigid multi-function sleeves 70 also serve to regulate the elastomers 40 to prevent them from twisting or snaking when they are compressed.

Referring to FIG. 17, it is noted that although both ends of the multi-function sleeve 70 have beveled surfaces 78 which converge into the hollow chamber 74 of the sleeve 70, the interior surface 73 of the sidewall 72 of the sleeve still has a straight section 75 at each side of the internal shelf 76, which straight sections 75 are aligned with the axial direction of the sidewall 72. This feature ensures that the respective end portions of adjacent elastomers will always have a press-fit engagement with the sleeve 70 through the non-beveled straight sections 75.

Referring to FIG. 18, the beveled surface 78 at each of the ends of the multi-function sleeve 70 is designed to better accommodate the shape of the elastomers 40 when they are compressed. When the deformable elastomers 40 are compressed, they deform into a generally drum shaped configuration. The beveled surface 78 at each of the ends of the multi-function sleeve 70 provides a better fitting between the deformed elastomers 40 and the sidewall 72 of the sleeve 70. Again, the generally drum shaped configuration of the elastomer 40 fills the gap between the sidewalls 72 of adjacent sleeves 70 and prevents any hard contact therebetween.

As shown in FIG. 19, the series of resilient elastomers 40 are again maintained in a coaxial stack along the axial direction of the tube 20 by the multi-function sleeves 70. The use of multi-function sleeves 70 eliminates any bending, twisting, bending and snaking of the resilient elastomers when they are compressed.

Referring to FIGS. 20 through 24, there is shown at 80 still another embodiment of the present invention multi-function sleeves. The multi-function sleeve 80 again has a cylindrical circumferential sidewall 82. The cylindrical circumferential sidewall 82 has an exterior surface 81 and an interior surface 83, where the interior surface 83 of the sidewall 82 defines a hollow chamber 84 which is accessible from both the two opposite ends of the multi-function sleeve 80. The multi-function sleeve 80 also has an integral internal annular shelf 86 located inside the hollow chamber 84.

The multi-function sleeve 80 has a circular bowl-shaped surface 88 at each of its two opposite ends. The bowl-shaped surfaces 88 at both ends of the multi-function sleeve 80 again converge into the hollow chamber 84 of the sleeve 80. These bowl-shaped surfaces serve a function which will be discussed later.

Referring to FIGS. 25 and 26, the rigid multi-function sleeves 80 again serve to interconnect the resilient elastomers 49 in a stacked series. The rigid multi-function sleeves 80 also serve to regulate the elastomers 49 to prevent them from twisting or snaking when they are compressed. The elastomers 49 shown in FIGS. 25 and 26 have an optional bore which serves the purpose of facilitating the inward expansion as the elastomers 49 being compressed.

Referring to FIG. 25, it is noted that although both ends of the multi-function sleeve 80 have circular bowl-shaped surfaces 88 which converge into the hollow chamber 84 of the sleeve 80, the interior surface 83 of the sidewall 82 of the sleeve still has a straight section 85 at each side of the internal shelf 86, which straight sections 85 are aligned with the axial direction of the sidewall 82. This feature ensures that the respective end portions of adjacent elastomers will always have a press-fit engagement with the sleeve 80 through the non-beveled straight sections 85.

Referring to FIG. 26, the bowl-shaped surface 88 at each of the ends of the multi-function sleeve 80 is designed to better accommodate the shape of the elastomers 49 when they are compressed. When the deformable elastomers 49 are compressed, they deform into a generally drum shaped configuration. The bowl-shaped surface 88 at each of the ends of the multi-function sleeve 80 provides an enlarged room for the deformed elastomers 49. Again, the generally drum shaped configuration of the elastomer 49 fills the gap between the sidewalls 82 of adjacent sleeves 80 and prevents any hard contact therebetween. The internal bores of the elastomers 49 increase the compressibility of the elastomers 49 because they allow the elastomers 49 to expand inwardly.

Figure 27:
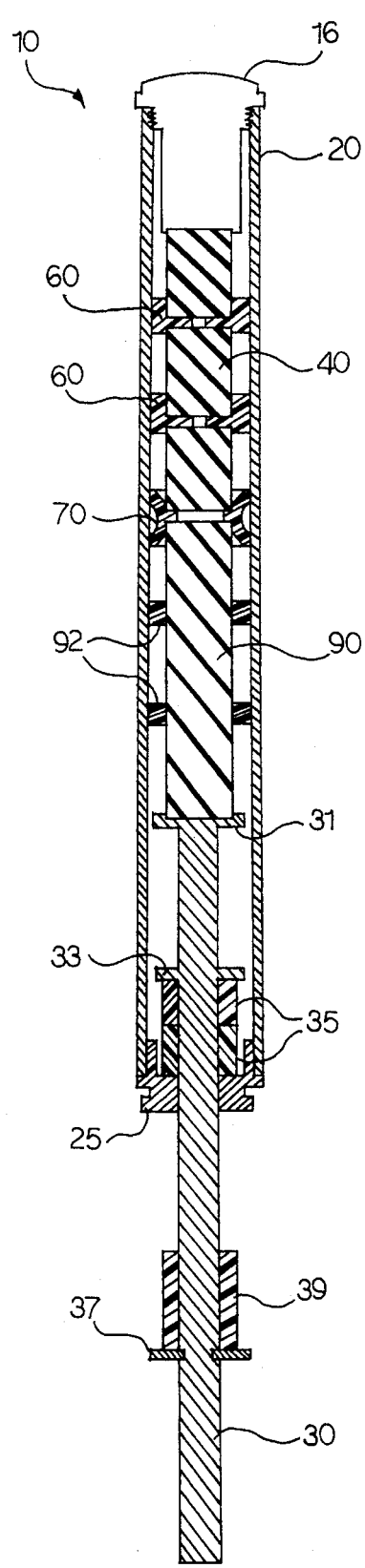
FIG. 27 is a cross-sectional view of the present invention shock-absorbing device for the body frames of bicycles and motorcycles utilizing both the multi-function sleeve shown in FIG. 4 and the multi-function sleeve shown in FIG. 12 with identical or different sized elastomers.
Figure 28:
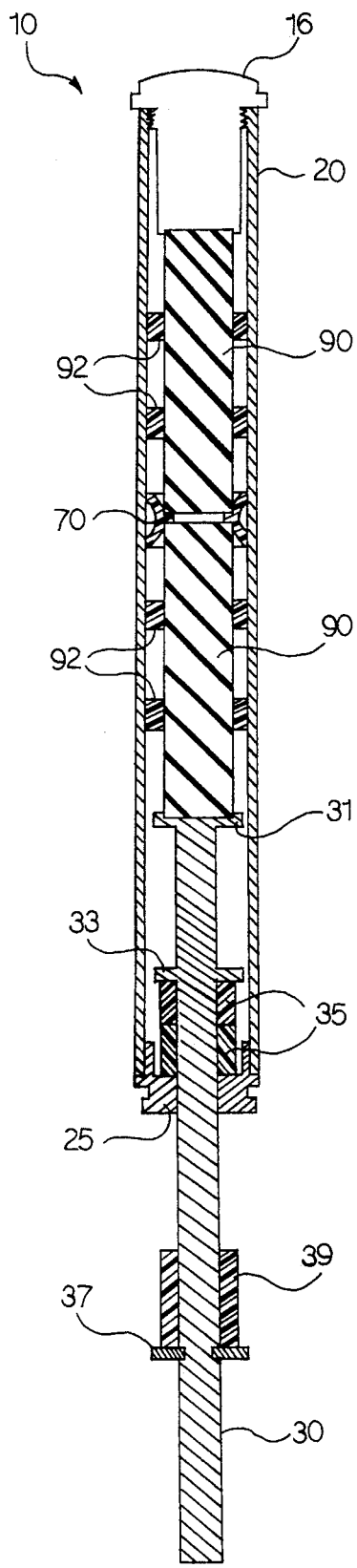
FIG. 28 is a cross-sectional view of the present invention shock-absorbing device for the body frames of bicycles and motorcycles, showing another example of the possible configurations of the elastomer and multi-function sleeve assembly.

Referring to FIGS. 27 and 28, there are shown that in other embodiments of the present invention shock-absorbing apparatus 10, different types of the multi-function sleeves can be used together with different types of compression elastomers. This feature provides greater flexibility to the individual user of the light-weight pedal-powered or motor-powered land or water surface vehicles and sports and exercising equipment which utilize the present invention shock-absorbing apparatus 10.

For example, as shown in FIG. 27, the upper three smaller elastomers 40 are retained, but the lower three smaller elastomers are replaced by an elongated elastomer 90. Two generally "H" shaped multi-function sleeves 60 are used between the smaller elastomers 40, and a generally hourglass shaped multi-function sleeve 70 is used between the last smaller elastomer 40 and the elongated elastomer 90. The elongated elastomer 90 has a different deformation characteristic when compressed, and therefore provides a different shock-absorbing effect as compared to the smaller elastomers 40. One or more rigid annular bands 92 may be placed on the elongated elastomer 90 to prevent it from twisting and snaking. The width, number and location of the rigid bands further provide means for fine-tuning the compressibility of the elongated elastomer 90.

For another example as shown in FIG. 28, all smaller elastomers are replaced by two elongated elastomers 90. A generally hourglass shaped multi-function sleeve 70 is used between the two elongated elastomers 90. Several rigid annular bands 92 may also be used together with the elongated elastomers 90 to prevent them from twisting and snaking.

Referring back to FIG. 3, the present invention shock-absorbing apparatus may further comprise an end cap assembly 16. The end cap assembly 16 is removably threaded to the distal end 28 of the elongated tube 20. It includes an adaptor 18 which has an end socket 19 for press-fit engagement with elastomer 41, which is the first one of the multiplicity of elastomers 40 most close to the distal end 28 of the tube 20. When all the elastomers 40 are interconnected by the multi-function sleeves 50 and the first elastomer 41 is attach to the end cap assembly 16 through press-fit engagement between the first elastomer 41 and the adaptor 18, the end cap assembly 16 and the compression elastomer assembly 14 are connected as one unit, which is shown in FIG. 3.

Therefore, by detaching the end cap assembly 16 from the distal end 28 of the tube 20, the entire compression elastomer assembly 14, including all of the resilient elastomers and rigid sleeves, can be removed together with the end cap assembly from the tube 20. This feature makes it possible to remove the compression elastomer assembly from the tube 20 as one interconnected series.

In some of the prior art patents, such as the Reisinger Patent, the elastomers are disconnected. Therefore, when the elastomers need to be removed, the tube has to be turned upside-down to dump the elastomers out. This means turning the whole vehicle or equipment upside-down if the tube is, for example, part of the front fork of the vehicle and the end cap is removable from the top end of the tube. The present invention shock-absorbing apparatus 10 has overcome this problem because all the elastomers 40 are interconnected by the multi-function sleeves 50.

Furthermore, it can be seen that in case one of the elastomers 40 needs to be replaced, it can be individually detached from the interconnected series of the elastomers and replaced without disturbing all the other interconnected elastomers. For example, if elastomer 42 needs to be replaced, it can be simply detached from the adjacent sleeves 51 and 52 without disturbing any one of the other interconnected elastomers 41, 43, 44, 45 and 46.

In some of the prior art patents, such as the Wilson '832 and '549 Patents, all the elastomers are skewered on a skewer. Therefore, when one of the inside elastomers needs to be replaced, all the rest of the outside elastomers need to be removed first. For example, if in FIG. 3 all the elastomers are skewered on a skewer whose lower end is free, then elastomers 43, 44, 45 and 46 will have to be removed from the skewer before elastomer 42 can be removed and replaced. The present invention shock-absorbing apparatus 10 has overcome this problem because each one of the elastomers can be individually detached from its adjacent sleeves.

Referring back to FIGS. 1, 2, 11 and 19, the compression elastomer assembly 14 of the present invention shock-absorbing apparatus is positioned between end cap assembly 16 and the compression flange 31 of the compression rod 30. The compression flange 31 of the compression rod 30 contacts the last one of the multiplicity of elastomers, which is elastomer 46, the one most close to the proximal end 34 of the compression rod 30.

The present invention shock-absorbing apparatus may also comprise an optional rebound damping assembly. The rebound damping assembly may include a rebound flange 33 located at the proximal end portion 32 of the elongated compression rod 30 inside the tube 20, and one or more rebound elastomers 35 placed on the compression rod 30 and positioned inside the tube 20 and between the rebound flange 33 of the compression rod 30 and the proximal end 22 of the tube 20. The rebound elastomers will provide a damping effect when rebound occurs upon the telescoping assembly 12.

The present invention shock-absorbing apparatus may further comprise an optional bottom-out prevention assembly. The bottom-out prevention assembly may include a detachable clip 37 attached to the distal end portion 36 of the elongated compression rod 30, and one or more bottom-out elastomers 39 placed on the compression rod 30 and positioned outside of the tube 20 and between the proximal end 22 of the tube 20 and the detachable clip 37. The bottom-out elastomer 39 will prevent the telescoping assembly 12 from bottoming-out.

The present invention shock-absorbing apparatus is designed to be used in the body frames of light-weight pedal-powered or motor-powered land or water surface vehicles and sports and exercising equipment, such as bicycles, mountain bikes, dirt bikes, off-road bikes, all terrain bikes, exercise bikes, motor-bikes, motorcycles, mopeds, scooters, snow-scooters, snow-mobiles, jet-skis and the like. The present invention shock-absorbing apparatus can be utilized in the front or rear wheel forks, or other suitable parts of the body frame, such as seat posts, of the above referenced vehicles or equipment.

It should be noted that although tile compression elastomer assembly shown in the examples of the present invention is placed in the telescoping assembly which includes a tube and a compression rod, the compression elastomer assembly of the present invention shock-absorbing apparatus can be used with other types of telescoping assemblies, such as the type of telescoping assemblies which includes an outer tube and an inner tube.

The present invention shock-absorbing apparatus has many advantageous features. It provides a new design and construction of a shock-absorbing suspension system utilizing a multiplicity of generally cylindrical shaped compressible elastomers, where the configuration of the elastomers assembly can be quickly and easily modified to adjust the compressibility of the shock-absorbing suspension system. In the present invention apparatus, each multi-function sleeve is positioned between two adjacent elastomers to interconnect the two adjacent elastomers, so that all the elastomers can be removed together in an interconnected series, while each individual elastomer can be replaced without disturbing or disconnecting other elastomers. The rigid multi-function sleeves further function as regulators and restrainers to the stacked resilient elastomers to prevent the stack of elastomers from twisting and snaking when they are compressed.

In the present invention shock-absorbing apparatus, each multi-function sleeve placed between two adjacent elastomers is interconnecting the two elastomers by press-fit engagement based upon the resiliency of the rubber elastomers, so that the press-fit can be tight enough to withhold the weight of the interconnected series of the elastomers and sleeves, but still allows removal of any one of the elastomers from the multi-function sleeve. This provides the desired interconnection between the two elastomers while still providing the flexibility of replacing any one of the elastomers individually.

In addition, in the present invention shock-absorbing apparatus, each multi-function sleeve placed between two adjacent elastomers has an integral internal structure located inside its hollow cylindrical chamber, so that the internal partition will prevent any relative sliding movement among the multi-function sleeve and the two adjacent elastomers. The internal structure can further be configured as a circular internal shelf, so that the weight and material cost of the multi-function sleeve are reduced. The exterior cylindrical sidewall of each multi-function sleeve may also have an annular groove, so that the weight and material cost of the multi-function sleeve are further reduced and the annular groove can better facilitate the handling of the multi-function sleeves.

Moreover, in the present invention shock-absorbing apparatus, each multi-function sleeve placed between two adjacent elastomers has a circular beveled or bowl-shaped surface at each of its two opposite ends converging into the hollow cylindrical chamber of the multi-function sleeve, which can better accommodate the drum shaped elastomers when they are compressed.

Defined in detail, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including an elongated hollow cylindrical tube and an elongated cylindrical compression rod, the tube and the compression rod each having a proximal end portion terminated at a proximal end and a distal end portion terminated at a distal end, the tube and compression rod further slidably engaged coaxially with the proximal end portion of the compression rod extending inside the tube; (b) a compression elastomer assembly including a multiplicity of cylindrical shaped resilient and deformable compression elastomers and a multiplicity of hollow cylindrical shaped rigid multi-function sleeves, the compression elastomers placed coaxially inside the hollow tube and between the distal end of the tube and the proximal end of the compression rod, and each multi-function sleeve having two opposite ends and positioned between two adjacent compression elastomers; (c) the each multi-function sleeve having a cylindrical circumferential sidewall with an exterior surface and an interior surface, the interior surface defining a hollow cylindrical chamber which is accessible from both the two opposite ends of the each multi-function sleeve, the internal diameter of the hollow chamber being slightly less than the external diameter of the two adjacent compression elastomers; (d) the each multi-function sleeve further having an integral internal partition located inside the hollow chamber; (e) the multiplicity of rigid multi-function sleeves interconnecting the multiplicity of resilient elastomers in a stacked series and regulating the elastomers to prevent them from twisting or snaking when being compressed, where the two adjacent compression elastomers are interconnected by the each multi-function sleeve at its the two opposite ends respectively through press-fit engagement, as an end portion of each the adjacent compression elastomer extending into the hollow chamber of the multi-function sleeve from a respective end thereof, engaged through press-fit with the interior surface of the sidewall of the multi-function sleeve, and abutted by the partition in the hollow chamber of the multi-function sleeve which prevents relative movement along the coaxial direction between the multi-function sleeve and the compression elastomers, with a gap formed between the sidewalls of adjacent rigid multi-function sleeves; (f) as the compression elastomer assembly is being compressed, the resilient elastomers deforming into a generally drum shaped configuration which fills the gap between the sidewalls of the rigid sleeves and thereby prevents hard contact therebetween; (g) an end cap assembly removably attached to the distal end of the elongated tube and having an adaptor with an end socket to engage through press-fit with a first one of the multiplicity of elastomers which is closest to the distal end of the tube for removal of the compression elastomer assembly as one unit attached to the end cap assembly; (h) a rebound damping means including a rebound flange at the proximal end portion of the elongated compression rod located inside the tube and at least one rebound elastomer placed on the compression rod and positioned inside of the tube and between the rebound flange of the compression rod and the proximal end of the tube; and (i) a bottom-out prevention means including a detachable clip attached to the distal end portion of the elongated compression rod and at least one bottom-out elastomer placed on the compression rod and positioned outside of the tube and between the proximal end of the tube and the clip; (j) whereby the multiplicity of rigid multi-function sleeves interconnect and regulate the compression of the multiplicity of resilient elastomers, the multiplicity of resilient elastomers can be removed as an interconnected stacked series, and the press-fit between the rigid sleeves and the resilient elastomers allows each elastomer to be replaced individually without disturbing or disconnecting other interconnected elastomers.

Defined broadly, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including a generally hollow cylindrical shaped elongated tube and a generally cylindrical shaped elongated compression rod, the tube and the compression rod each having a proximal end and a distal end, the tube and compression rod further slidably engaged coaxially with the proximal end of the compression rod extending inside the tube; (b) a compression elastomer assembly including a multiplicity of generally cylindrical shaped resilient and deformable compression elastomers and a multiplicity of generally hollow cylindrical shaped rigid multi-function sleeves, the compression elastomers placed coaxially inside the hollow tube and between the distal end of the tube and the proximal end of the compression rod, and each multi-function sleeve having two opposite ends and positioned between two adjacent compression elastomers; (c) the each multi-function sleeve having a generally cylindrical shaped circumferential sidewall with an exterior surface and an interior surface, the interior surface defining a generally cylindrical hollow chamber which is accessible from both the two opposite ends of the each multi-function sleeve, the internal diameter of the hollow chamber being slightly less than the external diameter of the two adjacent compression elastomers; (d) the each multi-function sleeve further having an integral internal partition located inside the hollow chamber; (e) the multiplicity of rigid multi-function sleeves interconnecting the multiplicity of resilient elastomers in a stacked series and regulating the elastomers to prevent them from twisting or snaking when being compressed, where the two adjacent compression elastomers are interconnected by the each multi-function sleeve at its the two opposite ends respectively through press-fit engagement, as an end portion of each the adjacent compression elastomer extending into the hollow chamber of the multi-function sleeve from a respective end thereof, engaged through press-fit with the interior surface of the sidewall of the multi-function sleeve, and abutted by the partition in the hollow chamber of the multi-function sleeve which prevents relative movement along the coaxial direction between the multi-function sleeve and the compression elastomers, with a gap formed between the sidewalls of adjacent rigid multi-function sleeves; and (f) an end cap assembly removably attached to the distal end of the elongated tube and having an adaptor with an end socket to engage through press-fit with a first one of the multiplicity of elastomers which is closest to the distal end of the tube for removal of the compression elastomer assembly as one unit attached to the end cap assembly; (g) whereby the multiplicity of rigid multi-function sleeves interconnect and regulate the compression of the multiplicity of resilient elastomers, the multiplicity of resilient elastomers can be removed as an interconnected stacked series, and the press-fit between the rigid sleeves and the resilient elastomers allows each elastomer to be replaced individually without disturbing or disconnecting other interconnected elastomers.

Defined more broadly, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including an elongated hollow tube and an elongated compression rod coaxially and slidably engaged; (b) a compression elastomer assembly including at least two resilient and deformable compression elastomers placed between the tube and compression rod and at least one rigid multi-function sleeve positioned between the at least two compression elastomers; (c) the multi-function sleeve having a circumferential sidewall with an exterior surface and an interior surface, the interior surface defining a hollow chamber which is accessible from two opposite ends of the multi-function sleeve, the internal diameter of the hollow chamber being slightly less than the external diameter of the at least two compression elastomers; (d) the rigid multi-function sleeve interconnecting the at least two resilient elastomers in a stacked series and regulating the elastomers to prevent them from twisting or snaking when being compressed, where the at least two compression elastomers are interconnected by the multi-function sleeve at its the two opposite ends respectively through press-fit engagement; and (e) the multi-function sleeve further having an integral internal partition located inside the hollow chamber for preventing relative movement along the coaxial direction between the multi-function sleeve and the compression elastomers; (f) whereby the rigid multi-function sleeve interconnects and regulates the compression of the at least two resilient elastomers, the at least two resilient elastomers can be removed as an interconnected stacked series, and the press-fit between the rigid sleeve and the resilient elastomers allows one elastomer to be replaced individually without disturbing or disconnecting the other elastomer.

Alternatively defined in detail, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including an elongated hollow cylindrical tube and an elongated cylindrical compression rod, the tube and the compression rod each having a proximal end portion terminated at a proximal end and a distal end portion terminated at a distal end, the tube and compression rod further slidably engaged coaxially with the proximal end portion of the compression rod extending inside the tube; (b) a compression elastomer assembly including a multiplicity of cylindrical shaped resilient and deformable compression elastomers and a multiplicity of hollow cylindrical shaped rigid multi-function sleeves, the compression elastomers placed coaxially inside the hollow tube and between the distal end of the tube and the proximal end of the compression rod, and each multi-function sleeve having two opposite ends and positioned between two adjacent compression elastomers; (c) the each multi-function sleeve having a cylindrical circumferential sidewall with an exterior surface and an interior surface, the interior surface defining a hollow cylindrical chamber which is accessible from both the two opposite ends of the each multi-function sleeve, the internal diameter of the hollow chamber being slightly less than the external diameter of the two adjacent compression elastomers; (d) the each multi-function sleeve further having an integral internal annular shelf located inside the hollow chamber; (e) the multiplicity of rigid multi-function sleeves interconnecting the multiplicity of resilient elastomers in a stacked series and regulating the elastomers to prevent them from twisting or snaking when being compressed, where the two adjacent compression elastomers are interconnected by the each multi-function sleeve at its the two opposite ends respectively through press-fit engagement, as an end portion of each the adjacent compression elastomer extending into the hollow chamber of the multi-function sleeve from a respective end thereof, engaged through press-fit with the interior surface of the sidewall of the multi-function sleeve, and abutted by the annular shelf in the hollow chamber of the multi-function sleeve which prevents relative movement along the coaxial direction between the multi-function sleeve and the compression elastomers; (f) as the compression elastomer assembly being compressed, the resilient elastomers deforming into a generally drum shaped configuration which fills the gap between the sidewalls of the rigid sleeves and thereby prevents hard contact therebetween; (g) the each multi-function sleeve further having a beveled surface at each of its the two opposite ends which converges into the hollow chamber of the each multi-function sleeve for accommodating the shape of the two adjacent deformable elastomers as they are being compressed into the generally drum shaped configuration; (h) the each multi-function sleeve further having an external annular groove recessed from the exterior surface of the sidewall of the multi-function sleeve for facilitating handling and reducing the weight of the sleeve; (i) an end cap assembly removably attached to the distal end of the elongated tube and having an adaptor with an end socket to engage through press-fit with a first one of the multiplicity of elastomers which is closest to the distal end of the tube for removal of the compression elastomer assembly as one unit attached to the end cap assembly; j) a rebound damping means including a rebound flange at the proximal end portion of the elongated compression rod located inside the tube and at least one rebound elastomer placed on the compression rod and positioned inside of the tube and between the rebound flange of the compression rod and the proximal end of the tube; and (k) a bottom-out prevention means including a detachable clip attached to the distal end portion of the elongated compression rod and at least one bottom-out elastomer placed on the compression rod and positioned outside of the tube and between the proximal end of the tube and the clip; (1) whereby the multiplicity of rigid multi-function sleeves interconnect and regulate the compression of the multiplicity of resilient elastomers, the multiplicity of resilient elastomers can be removed as an interconnected stacked series, and the press-fit between the rigid sleeves and the resilient elastomers allows each elastomer to be replaced individually without disturbing or disconnecting other interconnected elastomers.

Alternatively defined broadly, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including a generally hollow cylindrical shaped elongated tube and a generally cylindrical shaped elongated compression rod, the tube and the compression rod each having a proximal end and a distal end, the tube and compression rod further slidably engaged coaxially with the proximal end of the compression rod extending inside the tube; (b) a compression elastomer assembly including a multiplicity of generally cylindrical shaped resilient and deformable compression elastomers and a multiplicity of generally hollow cylindrical shaped rigid multi-function sleeves, the compression elastomers placed coaxially inside the hollow tube and between the distal end of the tube and the proximal end of the compression rod, and each multi-function sleeve having two opposite ends and positioned between two adjacent compression elastomers; (c) the each multi-function sleeve having a generally cylindrical shaped circumferential sidewall with an exterior surface and an interior surface, the interior surface defining a generally cylindrical hollow chamber which is accessible from both the two opposite ends of the each multi-function sleeve, the internal diameter of the hollow chamber being slightly less than the external diameter of the two adjacent compression elastomers; (d) the each multi-function sleeve further having an integral internal annular shelf located inside the hollow chamber; (e) the multiplicity of rigid multi-function sleeves interconnecting the multiplicity of resilient elastomers in a stacked series and regulating the elastomers to prevent them from twisting or snaking when being compressed, where the two adjacent compression elastomers are interconnected by the each multi-function sleeve at its the two opposite ends respectively through press-fit engagement, as an end portion of each the adjacent compression elastomer extending into the hollow chamber of the multi-function sleeve from a respective end thereof, engaged through press-fit with the interior surface of the sidewall of the multi-function sleeve, and abutted by the annular shelf in the hollow chamber of the multi-function sleeve which prevents relative movement along the coaxial direction between the multi-function sleeve and the compression elastomers; (f) the each multi-function sleeve further having a beveled surface at each of its the two opposite ends which converges into the hollow chamber of the each multi-function sleeve for accommodating the shape of the two adjacent deformable elastomers as they are being compressed into a generally drum shaped configuration; (g) the each multi-function sleeve further having an external annular groove recessed from the exterior surface of the sidewall of the multi-function sleeve for facilitating handling and reducing the weight of the sleeve; and (h) an end cap assembly removably attached to the distal end of the elongated tube and having an adaptor with an end socket to engage through press-fit with a first one of the multiplicity of elastomers which is closest to the distal end of the tube for removal of the compression elastomer assembly as one unit attached to the end cap assembly; (i) whereby the multiplicity of rigid multi-function sleeves interconnect and regulate the compression of the multiplicity of resilient elastomers, the multiplicity of resilient elastomers can be removed as an interconnected stacked series, and the press-fit between the rigid sleeves and the resilient elastomers allows each elastomer to be replaced individually without disturbing or disconnecting other interconnected elastomers.

Alternatively defined more broadly, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including an elongated hollow tube and an elongated compression rod coaxially and slidably engaged; (b) a compression elastomer assembly including at least two resilient and deformable compression elastomers placed between the tube and compression rod and at least one rigid multi-function sleeve positioned between the at least two compression elastomers; (c) the multi-function sleeve having a circumferential sidewall with an exterior surface and an interior surface, the interior surface defining a hollow chamber which is accessible from two opposite ends of the multi-function sleeve, the internal diameter of the hollow chamber being slightly less than the external diameter of the at least two compression elastomers; (d) the rigid multi-function sleeves interconnecting the at least two resilient elastomers in a stacked series and regulating the elastomers to prevent them from twisting or snaking when being compressed, where the at least two compression elastomers are interconnected by the multi-function sleeve at its the two opposite ends respectively through press-fit engagement; (e) the multi-function sleeve further having an integral internal annular shelf located inside the hollow chamber for preventing relative movement along the coaxial direction between the multi-function sleeve and the compression elastomers; and (f) the multi-function sleeve further having a beveled surface at each of its the two opposite ends which converges into the hollow chamber of the multi-function sleeve for accommodating the shape of the deformable elastomers as they are being compressed into a generally drum shaped configuration; (g) whereby the rigid multi-function sleeve interconnects and regulates the compression of the at least two resilient elastomers, the at least two resilient elastomers can be removed as an interconnected stacked series, and the press-fit between the rigid sleeve and the resilient elastomers allows one elastomer to be replaced individually without disturbing or disconnecting the other elastomer.

Also alternatively defined in detail, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including an elongated hollow cylindrical tube and an elongated cylindrical compression rod, the tube and the compression rod each having a proximal end portion terminated at a proximal end and a distal end portion terminated at a distal end, the tube and compression rod further slidably engaged coaxially with the proximal end portion of the compression rod extending inside the tube; (b) a compression elastomer assembly including a multiplicity of cylindrical shaped resilient and deformable compression elastomers and a multiplicity of hollow cylindrical shaped rigid multi-function sleeves, the compression elastomers placed coaxially inside the hollow tube and between the distal end of the tube and the proximal end of the compression rod, and each multi-function sleeve having two opposite ends and positioned between two adjacent compression elastomers; (c) the each multi-function sleeve having a cylindrical circumferential sidewall with an exterior surface and an interior surface, the interior surface defining a hollow cylindrical chamber which is accessible from both the two opposite ends of the each multi-function sleeve, the internal diameter of the hollow chamber being slightly less than the external diameter of the two adjacent compression elastomers; (d) the each multi-function sleeve further having an integral internal annular shelf located inside the hollow chamber; (e) the multiplicity of rigid multi-function sleeves interconnecting the multiplicity of resilient elastomers in a stacked series and regulating the elastomers to prevent them from twisting or snaking when being compressed, where the two adjacent compression elastomers are interconnected by the each multi-function sleeve at its the two opposite ends respectively through press-fit engagement, as an end portion of each the adjacent compression elastomer extending into the hollow chamber of the multi-function sleeve from a respective end thereof, engaged through press-fit with the interior surface of the sidewall of the multi-function sleeve, and abutted by the annular shelf in the hollow chamber of the multi-function sleeve which prevents relative movement along the coaxial direction between the multi-function sleeve and the compression elastomers, with a gap formed between the sidewalls of adjacent rigid multi-function sleeves; (f) as the compression elastomer assembly is being compressed, the resilient elastomers deforming into a generally drum shaped configuration which fills the gap between the sidewalls of the rigid sleeves and thereby prevents hard contact therebetween; (g) the each multi-function sleeve further having a circular bowl-shaped surface at each of its the two opposite ends which converges into the hollow chamber of the each multi-function sleeve for accommodating the shape of the two adjacent deformable elastomers as they are being compressed into the generally drum shaped configuration; (h) the each multi-function sleeve further having an external annular groove recessed from the exterior surface of the sidewall of the multi-function sleeve for facilitating handling and reducing the weight of the sleeve; (i) an end cap assembly removably attached to the distal end of the elongated tube and having an adaptor with an end socket to engage through press-fit with a first one of the multiplicity of elastomers which is closest to the distal end of the tube for removal of the compression elastomer assembly as one unit attached to the end cap assembly; (j) a rebound damping means including a rebound flange at the proximal end portion of the elongated compression rod located inside the tube and at least one rebound elastomer placed on the compression rod and positioned inside of the tube and between the rebound flange of the compression rod and the proximal end of the tube; and (k) a bottom-out prevention means including a detachable clip attached to the distal end portion of the elongated compression rod and at least one bottom-out elastomer placed on the compression rod and positioned outside of the tube and between the proximal end or the tube and the clip; (1) whereby the multiplicity of rigid multi-function sleeves interconnect and regulate the compression of the multiplicity of resilient elastomers, the multiplicity of resilient elastomers can be removed as an interconnected stacked series, and the press-fit between the rigid sleeves and the resilient elastomers allows each elastomer to be replaced individually without disturbing or disconnecting other interconnected elastomers.

Also alternatively defined broadly, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including a generally hollow cylindrical shaped elongated tube and a generally cylindrical shaped elongated compression rod, the tube and the compression rod each having a proximal end and a distal end, the tube and compression rod further slidably engaged coaxially with the proximal end of the compression rod extending inside the tube; (b) a compression elastomer assembly including a multiplicity of generally cylindrical shaped resilient and deformable compression elastomers and a multiplicity of generally hollow cylindrical shaped rigid multi-function sleeves, the compression elastomers placed coaxially inside the hollow tube and between the distal end of the tube and the proximal end of the compression rod, and each multi-function sleeve having two opposite ends and positioned between two adjacent compression elastomers; (c) the each multi-function sleeve having a generally cylindrical shaped circumferential sidewall with an exterior surface and an interior surface, the interior surface defining a generally cylindrical hollow chamber which is accessible from both the two opposite ends of the each multi-function sleeve, the internal diameter of the hollow chamber being slightly less than the external diameter of the two adjacent compression elastomers; (d) the each multi-function sleeve further having an integral internal annular shelf located inside the hollow chamber; (e) the multiplicity of rigid multi-function sleeves interconnecting the multiplicity of resilient elastomers in a stacked series and regulating the elastomers to prevent them from twisting or snaking when being compressed, where the two adjacent compression elastomers are interconnected by the each multi-function sleeve at its the two opposite ends respectively through press-fit engagement, as an end portion of each the adjacent compression elastomer extending into the hollow chamber of the multi-function sleeve from a respective end thereof, engaged through press-fit with the interior surface of the sidewall of the multi-function sleeve, and abutted by the annular shelf in the hollow chamber of the multi-function sleeve which prevents relative movement along the coaxial direction between the multi-function sleeve and the compression elastomers, with a gap formed between the sidewalls of adjacent rigid multi-function sleeves; (f) the each multi-function sleeve further having a bowl-shaped surface at each of its the two opposite ends which converges into the hollow chamber of the each multi-function sleeve for accommodating the shape of the two adjacent deformable elastomers as they are being compressed into a generally drum shaped configuration; (g) the each multi-function sleeve further having an external annular groove recessed from the exterior surface of the sidewall of the multi-function sleeve for facilitating handling and reducing the weight of the sleeve; and (h) an end cap assembly removably attached to the distal end of the elongated tube and having an adaptor with an end socket to engage through press-fit with a first one of the multiplicity of elastomers which is closest to the distal end of the tube for removal of the compression elastomer assembly as one unit attached to the end cap assembly; (i) whereby the multiplicity of rigid multi-function sleeves interconnect and regulate the compression of the multiplicity of resilient elastomers, the multiplicity of resilient elastomers can be removed as an interconnected stacked series, and the press-fit between the rigid sleeves and the resilient elastomers allows each elastomer to be replaced individually without disturbing or disconnecting other interconnected elastomers.

Also alternatively defined more broadly, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including an elongated hollow tube and an elongated compression rod coaxially and slidably engaged; (b) a compression elastomer assembly including at least two resilient and deformable compression elastomers placed between the tube and compression rod and at least one rigid multi-function sleeve positioned between the at least two compression elastomers; (c) the multi-function sleeve having a circumferential sidewall with an exterior surface and an interior surface, the interior surface defining a hollow chamber which is accessible from two opposite ends of the multi-function sleeve, the internal diameter of the hollow chamber being slightly less than the external diameter of the at least two compression elastomers; (d) the rigid multi-function sleeve interconnecting the at least two resilient elastomers in a stacked series and regulating the elastomers to prevent them from twisting or snaking when being compressed, where the at least two compression elastomers are interconnected by the multi-function sleeve at its the two opposite ends respectively through press-fit engagement; (e) the multi-function sleeve further having an integral internal annular shelf located inside the hollow chamber for preventing relative movement along the coaxial direction between the multi-function sleeve and the compression elastomers; and (f) the multi-function sleeve further having a generally bowl-shaped surface at each of its the two opposite ends which converges into the hollow chamber of the multi-function sleeve for accommodating the shape of the deformable elastomers as they are being compressed into a generally drum shaped configuration; (g) whereby the rigid multi-function sleeve interconnects and regulates the compression of the at least two resilient elastomers, the at least two resilient elastomers can be removed as an interconnected stacked series, and the press-fit between the rigid sleeve and the resilient elastomers allows one elastomer to be replaced individually without disturbing or disconnecting the other elastomer.

Further defined generally, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including an elongated hollow cylindrical tube and an elongated cylindrical compression rod, the tube and the compression rod each having a proximal end portion terminated at a proximal end and a distal end portion terminated at a distal end, the tube and compression rod further slidably engaged coaxially with the proximal end portion of the compression rod extending inside the tube; (b) a compression elastomer assembly including a multiplicity of cylindrical shaped resilient and deformable compression elastomers and a multiplicity of hollow cylindrical shaped rigid multi-function sleeves, the compression elastomers placed coaxially inside the hollow tube and between the distal end of the tube and the proximal end of the compression rod, and each multi-function sleeve having two opposite ends and positioned between two adjacent compression elastomers; (c) the each multi-function sleeve having a cylindrical circumferential sidewall with an exterior surface and an interior surface, the interior surface defining a hollow cylindrical chamber which is accessible from both the two opposite ends of the each multi-function sleeve, the internal diameter of the hollow chamber being slightly less than the external diameter of the two adjacent compression elastomers; (d) the multiplicity of rigid multi-function sleeves interconnecting the multiplicity of resilient elastomers in a stacked series and regulating the elastomers to prevent them from twisting or snaking when being compressed, where the two adjacent compression elastomers are interconnected by the each multi-function sleeve at its the two opposite ends respectively through press-fit engagement, as an end portion of each the adjacent compression elastomer extending into the hollow chamber of the multi-function sleeve from a respective end thereof, engaged through press-fit with the interior surface of the sidewall of the multi-function sleeve with a gap formed between the sidewalls of adjacent rigid multi-function sleeves; (e) the each multi-function sleeve further having an integral internal structure for preventing relative movement along the coaxial direction between the rigid multi-function sleeve and the adjacent resilient elastomers; (f) as the compression elastomer assembly is being compressed, the resilient elastomers deforming into a generally drum shaped configuration which fills the gap between the sidewalls of the rigid sleeves and thereby prevents hard contact therebetween; (g) an end cap assembly removably attached to the distal end of the elongated tube and having an adaptor with an end socket to engage through press-fit with a first one of the multiplicity of elastomers which is closest to the distal end of the tube for removal of the compression elastomer assembly as one unit attached to the end cap assembly; (h) a rebound damping means including a rebound flange at the proximal end portion of the elongated compression rod located inside the tube and at least one rebound elastomer placed on the compression rod and positioned inside of the tube and between the rebound flange of the compression rod and the proximal end of the tube; and (i) a bottom-out prevention means including a detachable clip attached to the distal end portion of the elongated compression rod and at least one bottom-out elastomer placed on the compression rod and positioned outside of the tube and between the proximal end of the tube and the clip; j) whereby the multiplicity of rigid multi-function sleeves interconnect and regulate the compression of the multiplicity of resilient elastomers, the multiplicity of resilient elastomers can be removed as an interconnected stacked series, and the press-fit between the rigid sleeves and the resilient elastomers allows each elastomer to be replaced individually without disturbing or disconnecting other interconnected elastomers.

Further defined broadly, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including a generally hollow cylindrical shaped elongated tube and a generally cylindrical shaped elongated compression rod, the tube and the compression rod each having a proximal end and a distal end, the tube and compression rod further slidably engaged coaxial with the proximal end of the compression rod extending inside the tube; (b) a compression elastomer assembly including a multiplicity of generally cylindrical shaped resilient and deformable compression elastomers and a multiplicity of generally hollow cylindrical shaped rigid multi-function sleeves, the compression elastomers placed coaxially inside the hollow tube and between the distal end of the tube and the proximal end of the compression rod, and each multi-function sleeve having two opposite ends and positioned between two adjacent compression elastomers; (c) the each multi-function sleeve having a generally cylindrical shaped circumferential sidewall with an exterior surface and an interior surface, the interior surface defining a generally cylindrical hollow chamber which is accessible from both the two opposite ends of the each multi-function sleeve, the internal diameter of the hollow chamber being slightly less than the external diameter of the two adjacent compression elastomers; (d) the multiplicity of rigid multi-function sleeves interconnecting the multiplicity of resilient elastomers in a stacked series and regulating the elastomers to prevent them from twisting or snaking when being compressed, where the two adjacent compression elastomers are interconnected by the each multi-function sleeve at its the two opposite ends respectively through press-fit engagement, as an end portion of each the adjacent compression elastomer extending into the hollow chamber of the multi-function sleeve from a respective end thereof, and engaged through press-fit with the interior surface of the sidewall of the multi-function sleeve; (e) the each multi-function sleeve further having means for preventing relative movement along the coaxial direction between the rigid multi-function sleeve and the adjacent resilient elastomers; and (f) an end cap assembly removably attached to the distal end of the elongated tube and having an adaptor with an end socket to engage through press-fit with a first one of the multiplicity of elastomers which is closest to the distal end of the tube for removal of the compression elastomer assembly as one unit attached to the end cap assembly; (g) whereby the multiplicity of rigid multi-function sleeves interconnect and regulate the compression of the multiplicity of resilient elastomers, the multiplicity of resilient elastomers can be removed as an interconnected stacked series, and the press-fit between the rigid sleeves and the resilient elastomers allows each elastomer to be replaced individually without disturbing or disconnecting other interconnected elastomers.

Further defined more broadly, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including an elongated hollow tube and an elongated compression rod coaxially and slidably engaged; (b) a compression elastomer assembly including at least three resilient and deformable compression elastomers placed between the tube and compression rod and at least two rigid multi-function sleeve positioned between the at least three compression elastomers; (c) the multi-function sleeves having a circumferential sidewall with an exterior surface and an interior surface, the interior surface defining a hollow chamber which is accessible from two opposite ends of the multi-function sleeve, the internal diameter of the hollow chamber being slightly less than the external diameter of the at least two compression elastomers; (d) the at least two rigid multi-function sleeves interconnecting the at least three resilient elastomers in a stacked series and regulating the elastomers to prevent them from twisting or snaking when being compressed, where the at least three compression elastomers are interconnected by the at least two multi-function sleeves at their the respective two opposite ends through press-fit engagement; and (e) one of the at least two rigid multi-function sleeves having an integral internal partition located inside the hollow chamber thereof, and the other one of the at least two rigid multi-function sleeves having an integral internal annular shelf located inside the hollow chamber thereof, both for preventing relative movement along the coaxial direction between the multi-function sleeves and the compression elastomers; (f) whereby the rigid multi-function sleeves interconnect and regulate the compression of the at least three resilient elastomers, the at least three resilient elastomers can be removed as an interconnected stacked series, and the press-fit between the rigid sleeve and the resilient elastomers allows one elastomer to be replaced individually without disturbing or disconnecting the other elastomers.

Further defined even more broadly, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including two members which can move relatively with regard to each other; (b) a compression elastomer assembly including at least two resilient and deformable compression elastomers placed between the two members and at least one rigid multi-function sleeve positioned between the at least two compression elastomers; (c) the multi-function sleeve having a circumferential sidewall with an exterior surface and an interior surface, the interior surface defining a hollow chamber which is accessible from two opposite ends of the multi-function sleeve, the internal diameter of the hollow chamber being slightly less than the external diameter of the at least two compression elastomers; and (d) the rigid multi-function sleeve interconnecting the at least two resilient elastomers in a stacked series and regulating the elastomers to prevent them from twisting or snaking when being compressed, where the at least two compression elastomers are interconnected by the multi-function sleeve at its the two opposite ends respectively through press-fit engagement; (e) whereby the rigid multi-function sleeve interconnects and regulates the compression of the at least two resilient elastomers, the at least two resilient elastomers can be removed as an interconnected stacked series, and the press-fit between the rigid sleeve and the resilient elastomers allows one elastomer to be replaced individually without disturbing or disconnecting the other elastomer.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A shock-absorbing apparatus for use in the body frames of light-weight pedal-powered or motor-powered land or water surface vehicles and sports and exercising equipment, the shock-absorbing apparatus comprising:

a. a telescoping assembly including an elongated hollow tube and an elongated compression rod coaxially and slidably engaged;

b. a compression elastomer assembly including at least two resilient and deformable compression elastomers placed between said tube and compression rod and at least one rigid multi-function sleeve positioned between the at least two compression elastomers;

c. said at least one multi-function sleeve having a circumferential sidewall with an exterior surface and an interior surface, the interior surface defining a hollow chamber which is accessible from two opposite ends of said at least one multi-function sleeve, the interior surface having a straight section for providing a press-fit engagement with said at least two compression elastomers;

d. said at least one multi-function sleeve interconnecting said at least two resilient elastomers in a stacked series and regulating said elastomers to prevent them from twisting or snaking when being compressed, where said at least two compression elastomers are interconnected by said at least one multi-function sleeve at its said two opposite ends respectively through said press-fit engagement;

e. said at least one multi-function sleeve further having an integral internal annular shelf located on said straight section of said interior surface for preventing relative movement along the coaxial direction between said at least one multi-function sleeve and said at least two compression elastomers;

f. said at least one multi-function sleeve further having a generally arcuate shaped surface at a close proximity to each of its said two opposite ends which converges into said straight section of said interior surface of said at least one multi-function sleeve for accommodating the shape of said deformable elastomers; and g. an end cap assembly removably attached to a distal end of said elongated tube and engaged through press-fit with a first one of said at least two compression elastomers which is closest to the distal end of said hollow tube for removal of said compression elastomer assembly as one unit attached to the end cap assembly;

h. whereby said at least one multi-function sleeve interconnects and regulates the compression of said at least two resilient elastomers, said at least two resilient elastomers can be removed as an interconnected stacked series, and the press-fit between said at least one multi-function sleeve and said at least two resilient elastomers allows one said elastomer to be replaced individually without disturbing or disconnecting the other elastomer.

2. The shock-absorbing apparatus as defined in claim 1 wherein said elongated compression rod has a widened end flange for abutting an adjacent one of said at least two elastomers.

3. The shock-absorbing apparatus as defined in claim 1 further comprising at least one rigid band placed over at least one of said at least two resilient elastomers to regulate its compression and prevent it from snaking.

4. A shock-absorbing apparatus for use in the body frames of light-weight pedal-powered or motor-powered land or water surface vehicles and sports and exercising equipment, the shock-absorbing apparatus comprising:

a. a telescoping assembly including an elongated hollow cylindrical tube and an elongated cylindrical compression rod, the tube and the compression rod each having a proximal end portion terminated at a proximal end and a distal end portion terminated at a distal end, the tube and compression rod further slidably engaged coaxially with the proximal end portion of the compression rod extending inside the tube;

b. a compression elastomer assembly including a multiplicity of cylindrical shaped resilient and deformable compression elastomers and a multiplicity of hollow cylindrical shaped rigid multi-function sleeves, the compression elastomers placed coaxially inside said hollow tube and between said distal end of said tube and said proximal end of said compression rod, and each multi-function sleeve having two opposite ends positioned between two adjacent compression elastomers;

c. said each multi-function sleeve having a cylindrical circumferential sidewall with an exterior surface and an interior surface, the interior surface defining a hollow cylindrical chamber which is accessible from both said two opposite ends of said each multi-function sleeve, the interior surface having a straight section for providing a press-fit engagement with said two adjacent compression elastomers;

d. said multiplicity of rigid multi-function sleeves interconnecting said multiplicity of resilient elastomers in a stacked series and regulating said elastomers to prevent them from twisting or snaking when being compressed, where said two adjacent compression elastomers are interconnected by said each multi-function sleeve at its said two opposite ends respectively through said press-fit engagement, as an end portion of each said adjacent compression elastomer extending into said hollow chamber of said each multi-function sleeve from a respective end thereof, engaged through press-fit with said interior surface of said sidewall of said each multi-function sleeve, with a gap formed between the sidewalls of adjacent rigid multi-function sleeves;

e. said each multi-function sleeve further having an integral internal structure for preventing relative movement along the coaxial direction between said each rigid multi-function sleeve and said adjacent resilient elastomers;

f. as said compression elastomer assembly is being compressed, said each resilient elastomer fills the gap between said sidewalls of said adjacent rigid multi-function sleeves and thereby prevents hard contact therebetween;

g. an end cap assembly removably attached to said distal end of said elongated tube and having an adaptor with an end socket to engage through press-fit with a first one of said multiplicity of elastomers which is closest to said distal end of said tube for removal of said compression elastomer assembly as one unit attached to the end cap assembly;

h. a rebound damping means including a rebound flange at said proximal end portion of said elongated compression rod located inside said tube and at least one rebound elastomer placed on said compression rod and positioned inside of said tube and between the rebound flange of said compression rod and said proximal end of said tube;

i. a bottom-out prevention means including a detachable clip attached to said distal end portion of said elongated compression rod and at least one bottom-out elastomer placed on said compression rod and positioned outside of said tube and between said proximal end of said tube and said clip; and j. wherein said each multi-function sleeve further has an arcuate shaped surface at a close proximity to each of its said two opposite ends which converges into said straight section of said interior surface of said each multi-function sleeve for accommodating the shape of said two adjacent deformable elastomers;

k. whereby said multiplicity of rigid multi-function sleeves interconnect and regulate the compression of said multiplicity of resilient elastomers, said multiplicity of resilient elastomers can be removed as an interconnected stacked series, and the press-fit between said multiplicity of rigid multi-function sleeves and said multiplicity of resilient elastomers allows said each elastomer to be replaced individually without disturbing or disconnecting other interconnected elastomers.

5. The shock-absorbing apparatus as defined in claim 4 wherein said integral internal structure of said each multi-function sleeve is an integral internal annular shelf located on said straight section of said interior surface of said each multi-function sleeve.

6. A shock-absorbing apparatus for use in the body frames of light-weight pedal-powered or motor-powered land or water surface vehicles and sports and exercising equipment, the shock-absorbing apparatus comprising:

a. a telescoping assembly including a generally hollow cylindrical shaped elongated tube and a generally cylindrical shaped elongated compression rod, the tube and the compression rod each having a proximal end and a distal end, the tube and compression rod further slidably engaged coaxially with the proximal end of the compression rod extending inside the tube;

b. a compression elastomer assembly including a multiplicity of generally cylindrical shaped resilient and deformable compression elastomers and a multiplicity of generally hollow cylindrical shaped rigid multi-function sleeves, the compression elastomers placed coaxially inside said hollow tube and between said distal end of said tube and said proximal end of said compression rod, and each multi-function sleeve having two opposite ends positioned between two adjacent compression elastomers;

c. said each multi-function sleeve having a generally cylindrical shaped circumferential sidewall with an exterior surface and an interior surface, the interior surface defining a generally cylindrical hollow chamber which is accessible from both said two opposite ends of said each multi-function sleeve, the interior surface having a straight section for providing a press-fit engagement with said two adjacent compression elastomers;

d. said multiplicity of rigid multi-function sleeves interconnecting said multiplicity of resilient elastomers in a stacked series and regulating said elastomers to prevent them from twisting or snaking when being compressed, where said two adjacent compression elastomers are interconnected by said each multi-function sleeve at its said two opposite ends respectively through said press-fit engagement, as an end portion of each said adjacent compression elastomer extending into said hollow chamber of said each multi-function sleeve from a respective end thereof, and engaged through press-fit with said interior surface of said sidewall of said each multi-function sleeve, with a gap formed between the sidewalls of adjacent rigid multifunction sleeves;

e. said each multi-function sleeve further having means for preventing relative movement along the coaxial direction between said each rigid multi-function sleeve and said adjacent resilient elastomers;

f. an end cap assembly removably attached to said distal end of said elongated tube and having an adaptor with an end socket to engage through press-fit with a first one of said multiplicity of elastomers which is closest to said distal end of said tube for removal of said compression elastomer assembly as one unit attached to the end cap assembly; and g. wherein said each multi-function sleeve further has an arcuate shaped surface at a close proximity to each of its said two opposite ends which converges into said straight section of said interior surface of said each multi-function sleeve for accommodating the shape of said two adjacent deformable elastomers;

h. whereby said multiplicity of rigid multi-function sleeves interconnect and regulate the compression of said multiplicity of resilient elastomers, said multiplicity of resilient elastomers can be removed as an interconnected stacked series, and the press-fit between said multiplicity of rigid multi-function sleeves and said multiplicity resilient elastomers allows said each elastomer to be replaced individually without disturbing or disconnecting other interconnected elastomers.

7. The shock-absorbing apparatus as defined in claim 6 wherein said means for preventing relative movement along the coaxial direction between said each rigid multi-function sleeve and said adjacent resilient elastomers is an integral internal annular shelf located on said straight section of said interior surface of said each multi-function sleeve.

8. The shock-absorbing apparatus as defined in claim 6 further comprising a rebound damping means which includes a rebound flange located adjacent to said proximal end of said elongated compression rod located inside said tube and at least one rebound elastomer placed on said compression rod and positioned inside of said tube and between the rebound flange of said compression rod and said proximal end of said tube.

9. The shock-absorbing apparatus as defined in claim 6 further comprising a bottom-out prevention means which includes a detachable clip attached to a location adjacent to said distal end of said elongated compression rod and at least one bottom-out elastomer placed on said compression rod and positioned outside of said tube and between said proximal end of said tube and said clip.

10. The shock-absorbing apparatus as defined in claim 6 wherein when said each resilient elastomer is compressed, it deforms and fills the gap between said sidewalls of said adjacent rigid multi-function sleeves and thereby prevents hard contact therebetween.

11. A shock-absorbing apparatus for use in the body frames of light-weight pedal-powered or motor-powered land or water surface vehicles and sports and exercising equipment, the shock-absorbing apparatus comprising:
   a. a telescoping assembly including two members which can move relatively with regard to each other;
   b. a compression elastomer assembly including at least two resilient and deformable compression elastomers placed between said two members and at least one rigid multi-function sleeve positioned between the at least two compression elastomers;
   c. said at least one multi-function sleeves having a circumferential sidewall with an exterior surface and an interior surface, the interior surface defining a hollow chamber which is accessible from two opposite ends of said multi-function sleeve, the interior surface having a straight section for providing a press-fit engagement with said at least two compression elastomers;
   d. said at least one multi-function sleeve interconnecting said at least two resilient elastomers in a stacked series and regulating said elastomers to prevent them from twisting or snaking when being compressed, where said at least two compression elastomers are interconnected by said at least one multi-function sleeve at its said two opposite ends respectively through said press-fit engagement; and
   e. an end cap assembly removably attached to a distal end of a respective one of said two members and engaged through press-fit with a first one of said at least two compression elastomers which is closest to the distal end of the respective one of said two members for removal of said compression elastomer assembly as one unit attached to the end cap assembly;
   f. whereby said at least one multi-function sleeve interconnects and regulates the compression of said at least two resilient elastomers, said at least two resilient elastomers can be removed as an interconnected stacked series, and the press-fit between said at least one multi-function sleeve and said at least two resilient elastomers allows one said elastomer to be replaced individually without disturbing or disconnecting the other elastomer.

12. The shock-absorbing apparatus as defined in claim 11 wherein said at least one multi-function sleeve further has an integral internal shelf located on said straight section of said interior surface for preventing relative movement along the coaxial direction between said at least one multi-function sleeve and said at least two compression elastomers.

13. The shock-absorbing apparatus as defined in claim 11 further comprising at least one rigid band placed over at least one of said at least two resilient elastomers to regulate its compression and prevent it from snaking.

* * * * *